US010044985B1

(12) United States Patent
Parker

(10) Patent No.: US 10,044,985 B1
(45) Date of Patent: Aug. 7, 2018

(54) VIDEO MONITORING USING PLENOPTIC CAMERAS AND MIRRORS

(71) Applicant: Amazon Technologies, Inc., Reno, NV (US)

(72) Inventor: Erik R. Parker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 579 days.

(21) Appl. No.: 13/656,148

(22) Filed: Oct. 19, 2012

(51) Int. Cl.
*H04N 7/18* (2006.01)
*H04N 5/341* (2011.01)
*H04N 9/12* (2006.01)
*H04N 5/225* (2006.01)

(52) U.S. Cl.
CPC ............. *H04N 7/18* (2013.01); *H04N 5/2259* (2013.01); *H04N 5/3415* (2013.01); *H04N 9/12* (2013.01)

(58) Field of Classification Search
CPC .... H04N 5/2259; H04N 5/23238; H04N 9/12; H04N 5/3145; G01V 8/14
USPC .......................... 348/143–169; 386/223, 224
See application file for complete search history.

(56) References Cited

U.S. PATENT DOCUMENTS

| | | | |
|---|---|---|---|
| 2005/0018058 A1 | 1/2005 | Aliaga et al. | |
| 2005/0259158 A1* | 11/2005 | Jacob | H04N 3/1562 348/218.1 |
| 2007/0252074 A1* | 11/2007 | Ng et al. | 250/208.1 |
| 2008/0225131 A1* | 9/2008 | Aoki | H04N 5/232 348/222.1 |
| 2008/0291202 A1 | 11/2008 | Minhas et al. | |
| 2009/0268970 A1* | 10/2009 | Babacan et al. | 382/232 |
| 2010/0073475 A1* | 3/2010 | Gibbs | H04N 5/2259 348/135 |
| 2011/0249121 A1 | 10/2011 | Taillade | |
| 2012/0200829 A1 | 8/2012 | Bronstein et al. | |
| 2012/0229679 A1 | 9/2012 | Georgiev et al. | |
| 2012/0243101 A1 | 9/2012 | Nagasaka et al. | |
| 2012/0281072 A1 | 11/2012 | Georgiev et al. | |
| 2013/0016181 A1 | 1/2013 | Penner | |
| 2014/0003762 A1* | 1/2014 | Macnamara | G02B 6/262 385/8 |
| 2014/0059462 A1* | 2/2014 | Wernersson | G06T 5/50 715/771 |

\* cited by examiner

*Primary Examiner* — Dave Czekaj
*Assistant Examiner* — Kathleen Nguyen
(74) *Attorney, Agent, or Firm* — Robert C. Kowert; Meyertons, Hood, Kivlin, Kowert & Goetzel, P.C.

(57) ABSTRACT

A video-based monitoring and image post-processing system may include a plenoptic camera that has multiple mirrors in its field of view. The plenoptic camera may capture four-dimensional light-field information for multiple images of its field of view and may embed that information in image data sent to a local or backend server for post-processing. An image processing application on the server may extract image data for pixels that collectively represent one of the mirrors, and apply a focusing operation on the extracted image data to generate a video stream of a virtual camera represented by the mirror, dependent on the image information and the distance between the mirror and the camera. The application may correct distortions due to the curvature of the mirror. The system may provide video monitoring in areas without a single line of sight without the need for a large number of expensive cameras.

21 Claims, 11 Drawing Sheets

VIDEO MONITORING USING PLENOPTIC CAMERAS AND MIRRORS

BACKGROUND

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

When items are received at a materials handling facility, they are typically placed into inventory (or "stowed") by agents working in the facility. When a customer places an order, one or several inventory items specified in the order are retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, International Standard Book Number (ISBN), or other designation (including proprietary designations) may be stored together within inventory. In some cases, in order to make better use of inventory stocking space, different items are stored together in a single storage location or stocking area. In some facilities, expensive items (e.g., jewelry) may be stored in vaults or in designated high-security inventory areas with restricted access.

In an inventory environment that includes a large number of many different items, it may be highly inefficient for a single employee to physically locate and pick every item for a given order. For example, different items specified in a given order may be stored at mutually remote locations within the inventory facility, which would require a single picking agent to traverse a long path through the facility. In addition, if similar items are to be stored at mutually remote locations following their receipt at the facility, it may be inefficient for a single employee to physically stow all of those items. Therefore, at any given point in time, there may be multiple agents working in different areas within the facility to carry out various picking and stowing operations, each of which can involve handling one item or a variety of different items. In some materials handling facilities, video security systems may be installed to address loss prevention, workplace violence, the physical security of the facility and the agents working therein.

Figure 1:
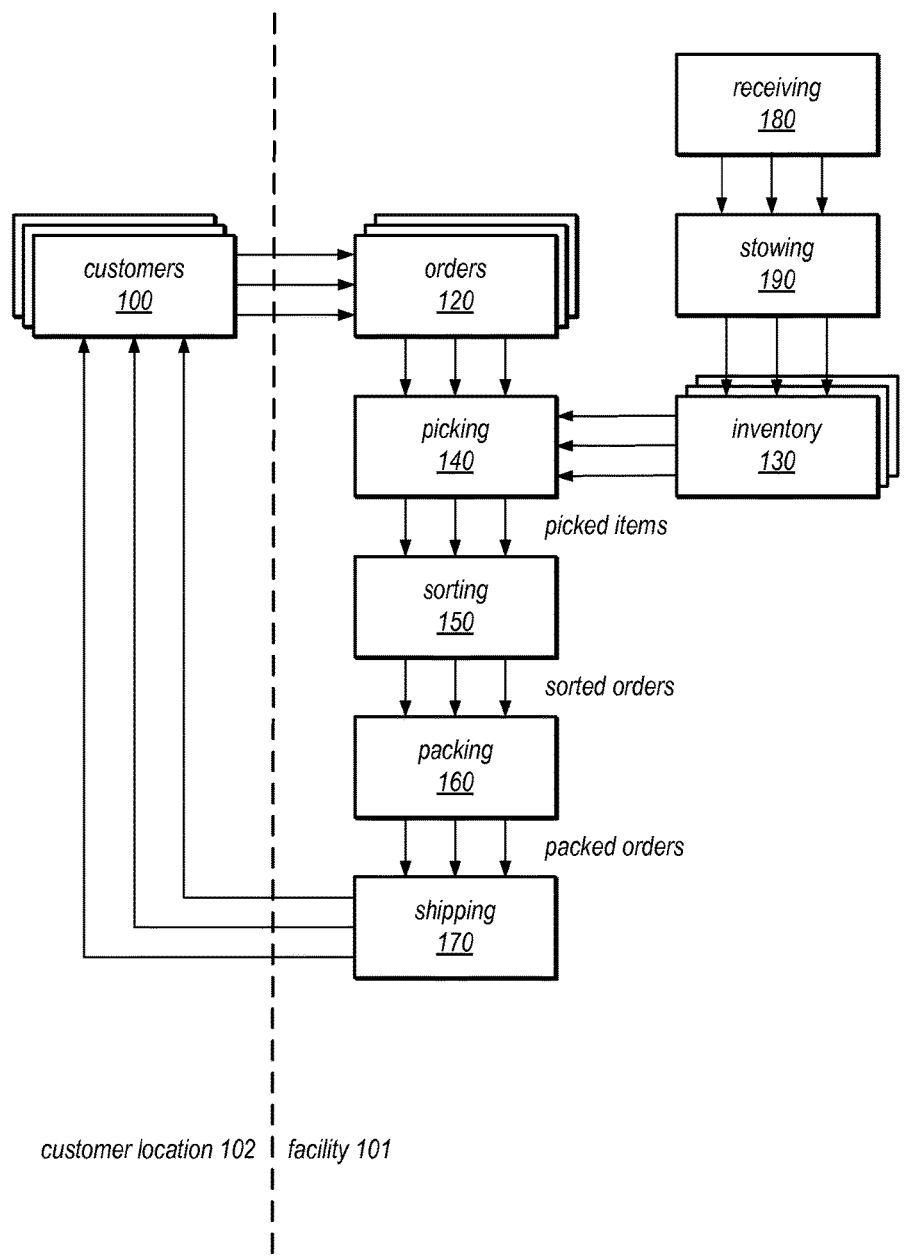
FIG. 1 illustrates a broad view of the operation of a materials handling facility, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As noted above, video security systems may be installed in a materials handling facility to address loss prevention, workplace violence, and the physical security of the facility and the agents working therein. However, it may be impractical and/or prohibitively expensive to install high-resolution video cameras on every aisle, even those it is desirable to be able to monitor every aisle. In addition, a large number of high-resolution cameras (such as would be required to provide coverage in a large materials handling facility) may generate a massive amount of data even in a short period of time (e.g., one week or one month), and moving this data from a security system that includes a large number of cameras to storage may require very high bandwidth connections.

In some embodiments, the video-based monitoring and image post-processing systems described herein may include a plenoptic camera that has multiple mirrors in its field of view. The plenoptic camera may capture four-dimensional light-field information for multiple images of a scene in its field of view (e.g., a sequence of single images or multiple frames of a video stream) and may embed that light-field information in image data sent to a local or backend server for post-processing. As described in more detail herein, an image processing application executing on the server may extract (from that captured image data) image data for pixels that collectively represent one of the mirrors, and may apply a focusing operation on the extracted image data to generate a video stream of a virtual camera represented by the mirror, dependent on the light-field information and/or on the distance between the mirror and the camera. The application may also correct distortions due to the shape and/or curvature of the mirror, in some embodiments.

By employing a plenoptic camera and multiple mirrors, the video-based monitoring and image post-processing systems described herein may in some embodiments provide video monitoring in areas of a materials handling facility that do not have a single line of sight without the need to install a large number of expensive cameras. For example, in some embodiments, the video-based monitoring and image post-processing systems described herein may include, for each camera, a single Ethernet line and a collection of relatively inexpensive mirrors (perhaps costing on the order of ten dollars each). In different embodiments, the mirrors may be flat, curved, or spherical. If the mirrors are flat, they may not induce as much distortion in the reflected images captured by the camera. However, they may not provide as much coverage in the facility as curved or spherical mirrors would provide. In some embodiments, pairs of flat mirrors may be used to provide better coverage of some areas in the facility.

Several different types of plenoptic cameras (sometimes referred to as "light-field cameras") have been proposed, and a few have actually been constructed. In general, all of these plenoptic cameras include a single photosensor and an array of microlenses, each of which captures a micro-image (representing a portion of the scene projected by the main lens) from a different position and angle. In other words, each microlens projects a micro-image (which contains multiple pixels) onto the camera's photosensor. As noted above, a plenoptic camera may capture four-dimensional light-field information (e.g., information in two planar dimensions and information in two angular dimensions), which is then embedded in the image data (for the micro-images) that makes up the output from the camera.

To construct a complete image from this output, image data corresponding to one or more pixels from each of the micro-images is assembled into a final image. The selection of these pixels from among the pixels of each of the micro-images may determine the depth of focus in the final image (or in different portions thereof), the objects that are in focus in the scene, and/or the angle at which various objects in the scene are depicted. For example, to construct an image (or a portion thereof) that is in focus at a particular depth (or focal length), a post-processing operation may be applied to select one or more particular pixels from each of the microlenses (dependent on the desired focal length and the geometry and/or arrangement of the microlens in the array) and to arrange them in rows and columns similar to those in the microlens array. In other words, by post-processing the image data captured by the plenoptic camera, a variety of final images can be constructed that are focused at one or multiple different depths. Similarly, by post-processing the image data captured by the plenoptic camera, multiple different images may be created for a single scene that are shifted slightly with respect to each other.

With one type of plenoptic camera in which the microlenses are focused on the main lens, one pixel is taken from each micro-image to construct a view at a particular depth, where each of the pixels has the same planar coordinates within its respective micro-image. For example, if the microlens array includes 100 k microlenses, each final (rendered) image will be a 100 k-pixel image, composed of one pixel from the same position within each micro-image, even if the raw image was captured on a 10 megapixel photosensor. In another type of plenoptic camera in which the microlenses are focused on an image plane formed by the main lens within the camera, there may be fewer microlenses, and thus fewer micro-images. With this type of plenoptic camera, multiple pixels from each micro-image may be appropriately assembled to construct a view at a particular depth (using vertical or horizontal shifts in the selected pixels to construct views at different depths). In some cases, much higher resolution images may be obtained with this type of plenoptic camera, but they may come at the expense of a tradeoff in depth.

An order fulfillment facility, or another type of materials handling facility, may employ a video-based monitoring and image post-processing system in various operations of the facility. FIG. 1 illustrates a broad view of the operations of a materials handling facility that is configured to utilize a video-based monitoring and image post-processing system such as that as described herein, according to one embodiment. In this example, multiple customers 100 may submit orders 120 to the distributor of the items in the facility, where each order 120 specifies one or more items (not shown) from inventory 130 to be shipped to the customer that submitted the order. In some embodiments, the orders may be submitted locally, such as by a customer that is present at the facility. In other embodiments, orders may be submitted remotely, such as through a network (e.g., Internet) based ordering system, a telephone-based ordering system, or physical mail (e.g., a catalog ordering system), among other possibilities (not shown). This is illustrated in FIG. 1 by the dashed line separating customers 100 (in customer location 102) from the other operations (located in facility 101). Note that a customer 100 may in various embodiments be a consumer, a distributor, a retailer, a buyer, a seller, or any other entity that places an order 120 to be fulfilled at facility 101, each of which interact with facility 101 using a different customer interface and/or service model.

In a materials handling facility, a picking agent, i.e., an agent engaged in a picking operation, may be provided instructions to locate and obtain a particular item from an inventory area. The instructions may include location, position, and/or descriptive information for the item (e.g., information stored in a product database on behalf of the materials handling facility), and may be usable by the picking agent to locate and identify the item to be obtained, or "picked." Similarly, a stowing agent, i.e., an agent engaged in a stowing operation, may be provided instructions to stow an item in a particular location and/or position in a given inventory area. Note that as used herein, the term "agent" may refer to a human person working in the materials handling facility. Note also that in various embodiments, an individual agent may act as a picking agent, a stowing agent, or an agent of another operation in the facility at different times, or may perform two or more roles while traversing the facility (e.g., picking some items and stowing others as they traverse the facility).

To fulfill the customer orders 120, the one or more items specified in each order may be retrieved or "picked" from inventory 130 (which may also be referred to as stock storage) in the materials handling facility, as indicated by block 140. In some embodiments, items may be identified from inventory based on information presented to facility personnel (i.e., agents) using any of a variety of communication devices. For example, the information presented may include directions to a particular inventory area within the facility, a description of the items to be picked, and/or position information for the items within a given inventory area. Picked items may be delivered to one or more stations (e.g., sorting stations, packing stations, re-binning stations, shipping stations) in the materials handling facility for sorting 150 into their respective orders, packing 160, and finally shipping 170 to the customers 100. Note that a picked, packed and shipped order does not necessarily include all of the items ordered by the customer; a shipped order may include only a subset of the ordered items available to ship at one time from one inventory-storing location. Additionally, if a customer 100 is present at the facility, the picked item(s) may be delivered directly to the customer 100 without being packed and/or shipped, or the customer 100 may be directed to pick them item(s) from the inventory areas of the facility, rather than having them picked for the customer by an agent of the facility, in various embodiments.

As illustrated in this example, a materials handling facility may also include a receiving operation 180 for receiving shipments of inventory items (i.e., stock) from various vendors and a stowing operation, illustrated as stowing 190, for placing the received stock into stock storage (inventory 130). In some embodiments, stowing 190 may involve stowing or placing an item in an inventory area within inventory 130 that is selected by a control system (e.g., randomly, pseudo-randomly, or according to various guidelines for stowing similar or different items within the facility). In some embodiments, items may be stored together based on their distinguishability from each other. For example, in some embodiments, the control system may be configured to automatically determine one or more inventory areas in which to stow an item such that the item is easily distinguishable from other co-located items. In other embodiments, an agent may select any inventory area in which there is room to stow the item, or may select any inventory area in which there is room for the item only if no similar items are already stored in that inventory area. Note that the arrangement and order of operations illustrated by FIG. 1 is merely one example of many possible embodiments of the operation of a materials handling facility that utilizes a video-based monitoring and image post-processing system. Other types of materials handling, manufacturing, or order fulfillment facilities, may include different, fewer, or additional operations and resources, according to different embodiments. Note also that the various operations of a materials handling facility may be located in one building or facility, or alternatively may be spread or subdivided across two or more buildings or facilities.

As described herein, a video-based monitoring and image post-processing system may be utilized in several areas of a materials handling facility, such as during stowing 190, picking 140, sorting 150, packing 160, and shipping 170. For example, in some embodiments a video-based monitoring and image post-processing system may be configured to capture, process, and/or analyze video input from cameras in the facility as agents store items in and/or retrieve items from inventory 130. In other embodiments, a video-based monitoring and image post-processing system may be configured to capture, process, and/or analyze video input from sorting, packing, and/or shipping operations. As described in more detail herein, a video-based monitoring and image post-processing system in a materials handling facility may be configured to capture image data using multiple plenoptic cameras, each of which is trained on multiple mirrors in which are reflected images of areas within the facility that are not directly in the field of view of the cameras, and to post-process the image data to generate video streams that represent images obtained from virtual cameras having the same field of view as the mirrors (as visible from the plenoptic cameras). Such a system may in some embodiments provide high-resolution video monitoring in the facility at a much lower cost than a system that relies on a larger number of dedicated physical cameras whose direct fields of view collectively encompass all areas of the facility.

Figure 2:
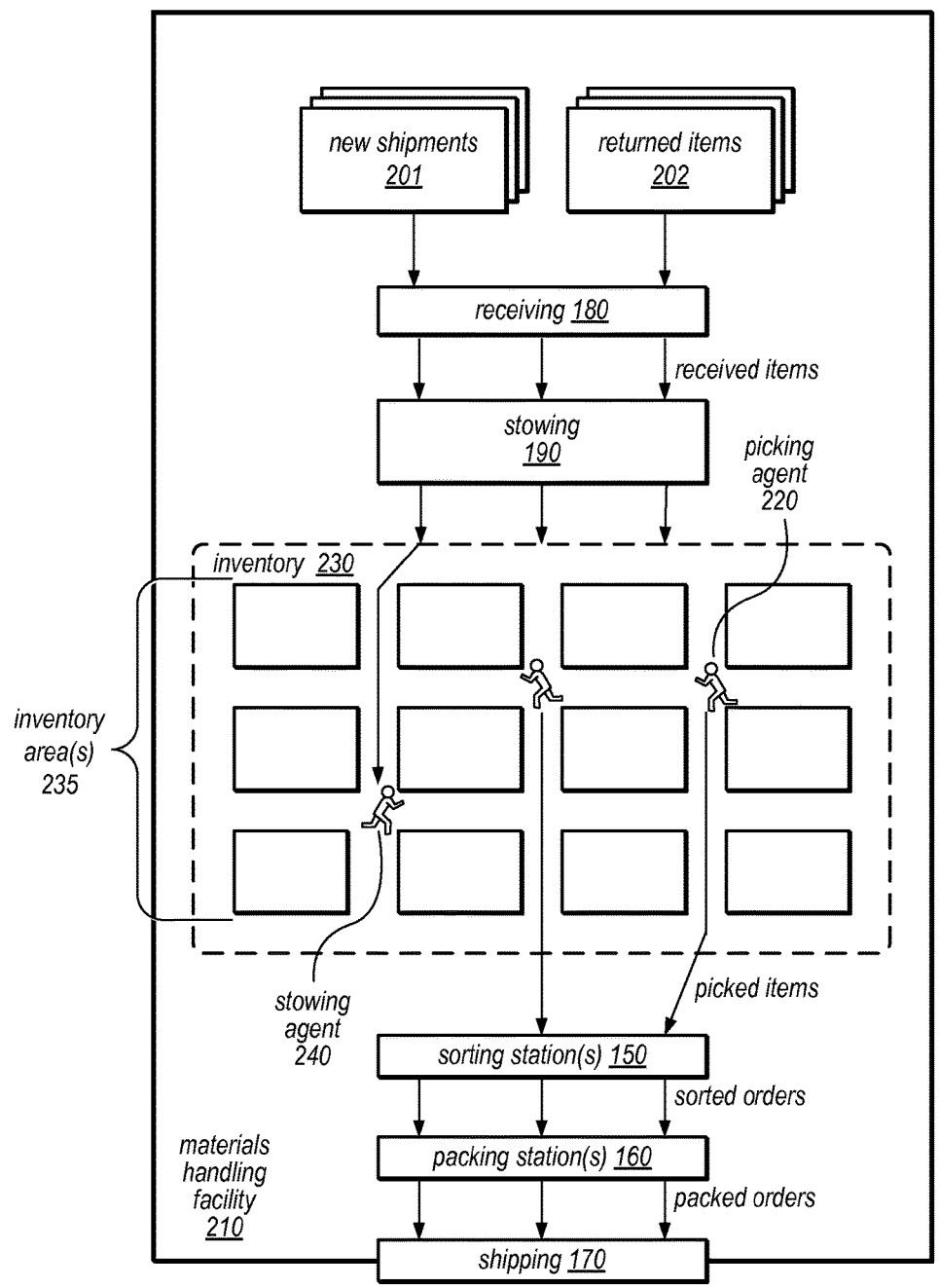
FIG. 2 illustrates an example physical layout of a materials handling facility, according to one embodiment.

The stations of a materials handling facility such as that described above may be arranged in many different configurations, according to different embodiments. FIG. 2 illustrates an example of a physical layout for a materials handling facility 210, according to one embodiment. In this example, items in inventory 230 may be marked or tagged with a bar-code, RFID tag, UPC, SKU code, ISBN, serial number, and/or other designation (including proprietary designations) to facilitate operations of materials handling facility 210, including, but not limited to, picking 140, sorting 150 and packing 160. These designations, or codes, may identify items by type, and/or may identify individual items within a type of item. At any time, one or more picking agents 220 may each be picking items (not shown) from inventory 230 to fulfill portions or all of one or more orders, and/or one or more stowing agents 240 may be placing items in inventory 230.

An order fulfillment facility such as materials handling facility 210 illustrated in FIG. 2 may implement an order fulfillment control system (or control system for short) as part of its overall inventory management system. The control system may include hardware and software configured for assisting and/or directing agents in the materials handling facility 210 in fulfilling customers' orders. For example, the control system may provide information to picking agents 220 and stowing agents 240 to increase speed and efficiency when locating items from among different items that may be co-located in a single inventory area 235 and when stowing items within an inventory area 235. In some embodiments, the control system may be configured to access location, position and/or descriptive information for items (e.g., from a product database or other data store) and may provide this information to picking agents 220 along with other information indicating items to be obtained from inventory. For example, a control system may provide instructions to a communication device (e.g., for display on or by that device) for directing a picking agent 220 to a particular inventory area 235, and additional information (e.g., position information and/or descriptive information) to assist the agent in locating one or more items in an inventory area 235 (e.g., "green mug, $3^{rd}$ from right", "wide, red box on far left", "video camera on left," or "solid black video camera"). After obtaining items from inventory 230, picking agents 220 may transfer those items to sorting stations 150, to a packing station 160, or to a combination sorting and packing station (not illustrated). While, in some embodiments, automated sorting may be utilized, in other embodiments sorting may be performed manually. Once an order is completed at a sorting station 150, the order may be ready to proceed to a packing station 160 to be packaged for shipping 170.

A materials handling facility may include one or more receiving stations 180 for receiving shipments of inventory items from various vendors or other sources. For example, both new shipments 201 and returned items 202 may be received at the facility. The received stock may then be placed into stock storage in one or more inventory areas 235 of inventory 230 during a stowing operation (illustrated as stowing 190 in FIG. 1). In various embodiments, items may be stored in inventory areas by an agent randomly, pseudo-randomly or according to one or more guidelines, or may be stored in an inventory area or location within an inventory area selected for each item automatically, such as by software executing on a control system. Random stowing of items may result in more efficient use of total inventory space than using a single inventory area for a single item or product, may increase the likelihood that any individual item may be easily distinguished from the other items with which it is stored, and/or may decrease the amount of time needed to store individual items into inventory. For example, a stowing agent 240 may begin with a pushcart full of items and may proceed to one of the inventory areas 235 in the facility. For each item in the pushcart, the stowing agent may look for an empty space on a shelf in the inventory area in which he is working that is large enough to hold the item. Once the agent locates an appropriately sized space, he may put the item there, and then scan a bar code on the shelf and a bar code on the item to let the system know where the item was stowed. This information may be stored in the product database for subsequent use in locating the specific item (e.g., the specific copy of an item of a particular type). It still may be beneficial in some embodiments to store similar items together to make better use of inventory space. For example, storing different books together on a single inventory shelf may use the available inventory space more efficiently than storing one book among other items of greatly differing size and shape, such as electronic devices, clothing, toys, hardware, materials, or other items. Thus, in some embodiments, a materials handling facility may store items of similar shape and size together in a single inventory area. For instance, in such an embodiment, items such as books, CDs, and DVDs may all be stored together.

In some embodiments, the control system may provide instructions to a stowing agent 240 to direct the agent to a particular inventory area 235, and may present additional information (e.g., text or image information) to assist the agent in locating a specific position within the inventory area 235 in which an item is to be placed. The control system may include, or may be used in conjunction with, handheld, mobile and/or fixed scanners or scanning devices that may be able to scan the marks or tags on individual items and/or inventory areas 235 to determine and record an identifier of an item and/or an item location. In some embodiments, an indicator of the inventory area in which the item is stowed and/or its position within that inventory area may be stored in a product database and associated with a product identification code or other item or product information (e.g., an item's inventory identification number, UPC, SKU code, ISBN, model number, version number and/or other designation, including a proprietary designation). This indicator may include a description of the inventory area, an inventory area location number, or other data representing the inventory area in which the item is stored in the facility, indexed by a product identification code, for example. In some embodiments, an indication of whether the item is considered to be a "high-value" item or a "lower-value item" may be stored in the database along with other descriptive information. As used herein, the term "high-value item" may refer to expensive items (i.e., those with a high monetary value as compared to other items being handled in the materials handling facility) and/or to items that are considered to be at high risk of being stolen (e.g., according to historical loss prevention data, the popularity and/or novelty of the items, the ease with which they may be stolen, the ease with which they may be re-sold once stolen, or other factors), while the term "lower-value item" may refer to an item that is considered to be at low risk of being stolen. In various embodiments, any or all of this information may then be available to control system devices, communication devices, or other computer devices used in subsequent operations of the facility. The control system may in some embodiments be configured to determine the location and/or position of a picking agent 220 or a stowing agent 240 (e.g., using an indirect asset tracking device or other communication device worn or carried by the agent) and may generate stowing or picking instructions for the agent that are dependent on the agent's current location within inventory 230.

In some embodiments, the video-based monitoring and image post-processing system described herein may be used to provide video monitoring in the materials handling facility. In such embodiments, a control system such as that described above (or a separate control component of the video-based monitoring and image post-processing system) may be configured to receive video information from and/or control the operation of multiple cameras in materials handling facility 210, which may include one or more one or more standard or plenoptic cameras capable of capturing still images and/or video. For example, the facility may include a sufficient number of video cameras and mirrors so that the fields of vision of the video cameras (including the reflections visible in the mirrors) collectively encompass all of the inventory areas of the materials handling facility, or all of the operations of the facility. The control system (or another component, such as a local or backend server component) may be configured to perform post-processing on the image information captured by the video cameras for the use of other operations within the facility (e.g., security and/or loss prevention operations), as described herein.

In some embodiments, by employing the video-based monitoring and image post-processing systems described herein, high-resolution video monitoring for security and/or loss prevention within the facility may be provided without having to install enough high-resolution video monitoring equipment (e.g., high-resolution video cameras) to cover all portions of the facility. Instead, a smaller number of still or video cameras may be installed, at least some of which may be trained on mirrors that reflect an image of other portions of the facility that are not directly in the field of view of any of the cameras. The image data obtained from these cameras may then be post-processed to generate different video or sequences of images that are focused on each of those other portions of the facility as well on the portions of the facility that are directly in the field of view of the cameras. For example, in some embodiments, a plenoptic camera may capture images of the objects in its field of view. If those objects include one or more mirrors that reflect a view of a portion of the facility that is not directly in the field of view of the camera, sequences of images corresponding to virtual cameras represented by the mirrors may be obtained by post-processing the information captured by the plenoptic camera. In such embodiments, the systems described herein may allow high-value items and lower-value items to be stored and/or handled anywhere in facility without the need to install a large number of dedicated video cameras to cover each area of the facility.

In various embodiments, depending on the layout of the materials handling facility, the mirrors and cameras may be positioned in a variety of different arrangements in order to provide the desired level of coverage in the facility. For example, in facilities in which there are a few wide main aisles and a large number of narrower side aisles (e.g., side aisles on which items are stored), the cameras may be installed on the wide aisles, and mirrors may be positioned along the wide aisles at the ends of the side aisles, with each mirror having in its field of view one or more side aisles. In some embodiments, the mirrors may be staggered in height or position such that multiple ones of the mirrors are visible by a single one of the cameras. In some embodiments, the mirrors may be positioned and oriented with respect to the cameras and the structures within the facility so that one or more of the cameras can "see" around corners within the facility.

Figure 3:
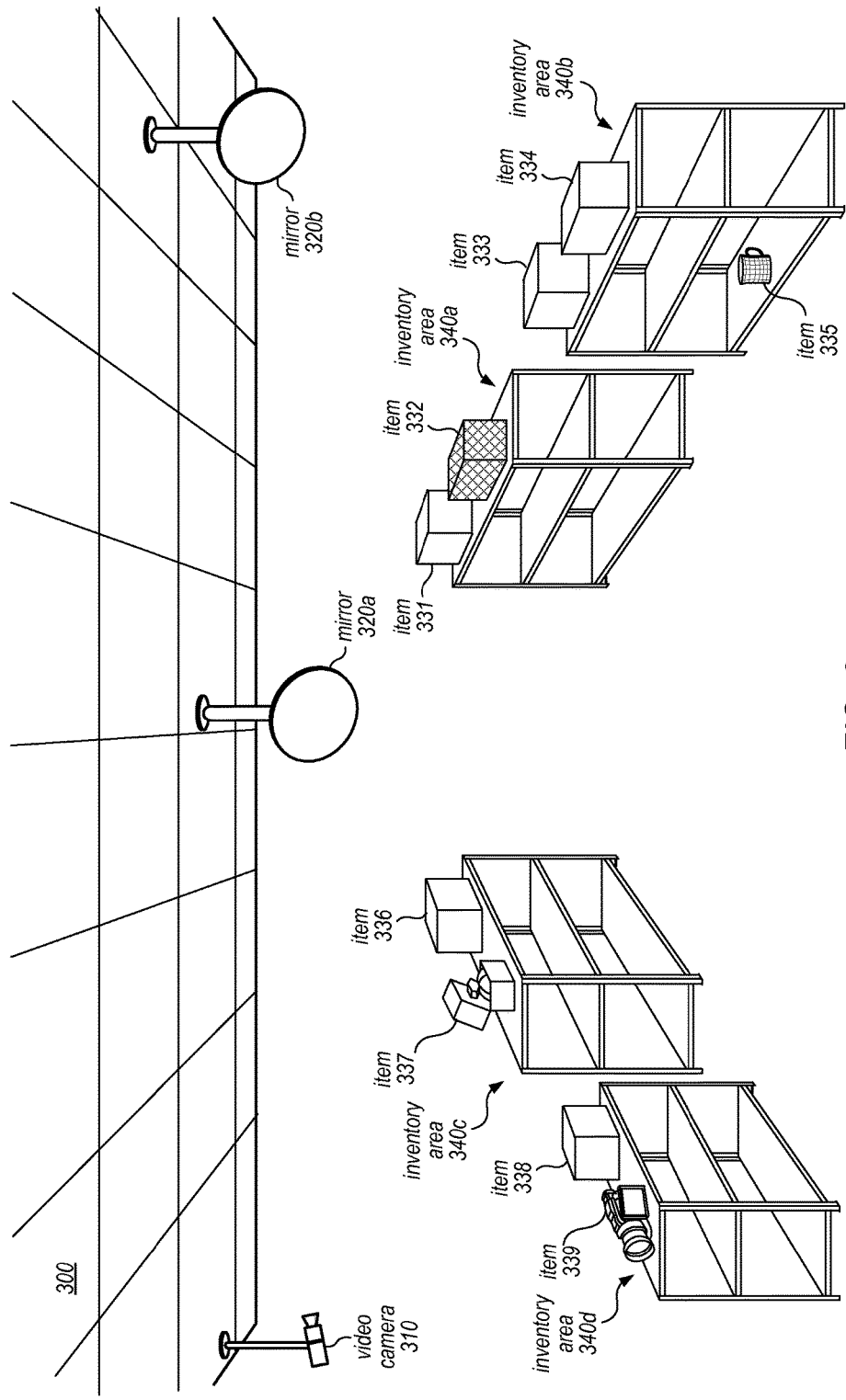
FIG. 3 illustrates a portion of a materials handling facility that employs a video-based monitoring and image post-processing system, according to one embodiment.

FIG. 3 illustrates a portion of a materials handling facility that employs a video-based monitoring and image post-processing system, according to one embodiment. In this example, the inventory areas of the facility are defined in terms of individual shelving units, while in other embodiments, an inventory area may include a row of shelving units, one or more racks or stacks of bins, or may be separated by partitions or walls. In the example illustrated in FIG. 3, a single video camera 310 is mounted in a position on the ceiling (300) such that the field of view of video camera 310 includes two mirrors (320a and 320b), each of which has in its field of view a different aisle within the facility. Here, the field of view of each mirror (as seen by video camera 310) includes the inventory areas on both sides of the aisle and the floor, and would also include any agent of the facility (e.g., a person or a piece of automated equipment) that is working in or passing through the area.

As illustrated in FIG. 3, by capturing the image reflected in mirror 320a, video camera 310 can be used to monitor activities in or near inventory areas 340a-340d (e.g., in the aisle bounded by these inventory areas and on both sides of that aisle), even though these inventory areas are largely (or completely) outside its field of view. In this example, inventory areas 340a-340d store a variety of different types of items, some of which may be considered high-value items (for the purposes of security and/or loss prevention) and others of which may not be considered high-value items. For example, inventory area 340a stores items 331 and 332, neither of which is considered a high-value item; inventory area 340b stores two lower-value items 333 and 334, and one high-value item 335 (e.g., a popular collector's item); inventory area 340c stores one lower-value item 336, and one high-value item 337 (e.g., an expensive piece of jewelry); and inventory area 340d stores one lower-value item 338, and one item 339 that may or may not be considered a high-value item, according to different policies employed in the facility. Images captured by video camera 310 when it is in the position illustrated in FIG. 3 may include at least partial views of all of these items from the perspective of a virtual camera in the position at which mirror 320a is mounted on the ceiling.

In this example, video camera 310 also captures the image reflected in mirror 320b, and thus may be used to monitor activities in the aisle on the other side of inventory areas 340a and 340b (e.g., the next aisle in the direction away from video camera 310). As illustrated in FIG. 3 this other aisle is bounded on one side by inventory areas 340a and 340b. Therefore, images captured by video camera 310 when it is in the position illustrated in FIG. 3 may include at least partial views of the items stored in these two inventory areas from the perspective of a virtual camera in the position at which mirror 320b is mounted on the ceiling (e.g., views of the "backs" of items that face the aisle that is in the field of view of mirror 320a). If the field of view of mirror 320b includes other inventory areas (e.g., inventory areas forming the boundary of the other aisle on the side opposite inventory areas 340a and 340b), images captured by video camera 310 when it is in the position illustrated in FIG. 3 may include at least partial views of any items stored in these additional inventory areas from the perspective of a virtual camera in the position at which mirror 320b is mounted.

As illustrated in this example, multiple cameras (e.g., still or video cameras that communicate with a control system and are components of a video-based monitoring and image post-processing system, some of which may be plenoptic cameras) may be used to monitor operations in a materials handling facility, including, but not limited to, stowing and picking operations. In some embodiments, some or all of these cameras may be configured to operate using a default or standard resolution and/or frame rate (e.g., a relatively low resolution and/or frame rate) until or unless a condition or event is detected that indicates closer scrutiny of the area on which the camera is trained is warranted, at which point the resolution and/or frame rate may be increased. By operating the cameras using the default or standard resolution and/or frame rate the vast majority of the time, the video-based monitoring and image post-processing system may not require the vast amounts of computing resources, storage resources, and connectivity resources that would be required if the system operated in a high-resolution mode all the time.

The selection of cameras and/or combinations of cameras to be used in a given facility may be dependent on a variety of factors, including, but not limited to: the area that can be covered by each type of camera, the total area of the facility to be covered by the cameras, the supported angles of the cameras (e.g., ceiling-mounted cameras might not be suitable for a facility with 30-foot high ceilings and 3-foot wide aisles), and/or the complexity of the desired functionality. The selection of cameras for a given facility and/or a location within that facility may be dependent in part on the operations that need to be monitored in the facility or in particular locations within the facility. For example, cameras supporting variable-resolution video, variable frame rates, and/or built-in video analytics may be required (or desirable) in some locations within the facility (e.g., in areas where agents may be handling high-value items unobserved by other agents). In other areas (e.g., areas in which no agents will be handling high-value items or high-traffic areas in which any suspicious activity is likely to be noticed) cameras that support only low resolution video and/or low frame rates may be sufficient.

In various embodiments, the video-based monitoring and image post-processing system described herein may employ video cameras (some of which may implement the functionality of a plenoptic camera), while in other embodiments, video streams may be constructed from sequences of images captured at a frame rate that approaches that of a video camera by standard or plenoptic still cameras (e.g., at a frame rate on the order of 5 frames per second). For example, in one embodiment, a still camera may be re-configured so that images captured by the camera are not stored on the camera itself for subsequent transfer (e.g., to a local server), but are stored off-camera instead (e.g., transferred directly to the local server by replacing a memory card with a wired or wireless adapter) for processing. In still other embodiments, video streams may be constructed from sequences of images that are captured by a still camera periodically at longer intervals (e.g., several times per minute), at predetermined times, and/or when excitedly directed to capture images in a sequence by the control system or a user. As used herein, the term "video camera" may encompass any camera that captures video streams (natively) or that is configured or instructed to obtain sequences of images, as described herein.

As noted above, the selection of cameras for use in the video-based monitoring and image post-processing system described herein may be dependent on the desired resolution of the resulting images. For example, video cameras with 2 megapixel sensors and 1080p output may provide video with sufficient resolution at a single focal length. However, when focusing at a single point (e.g., halfway down an aisle), everything else in the image may be blurred to some degree (varying from a little to a lot). In order to obtain good results when post-processing images to focus on the reflections in multiple mirrors (e.g., mirrors that may be at different distances from the camera), cameras with 10-12 megapixel sensors may be more suitable, depending on the size of the sensors (i.e., a lower resolution sensor may be sufficient if it is large enough, while a higher resolution sensor may be required if it is small). In general, the farther away the mirrors are from the cameras, the higher the required resolution may be. Note, however, that large sensors may be much more expensive than smaller sensors with comparable resolution. In addition, the desired resolution may be dependent on the particular application of the video-based monitoring and image post-processing system. For example, higher-resolution images (and corresponding sensors) may be required to distinguish between similar items stored in the same inventory area. However, lower-resolution images (and corresponding sensors) may be sufficient for detecting a person (or even a particular person) in one of the aisles of the facility.

In some embodiments, the video cameras and mirrors of a video-based monitoring and image post-processing system may be fixed in position (rather than movable or able to be repositioned, once installed). The video cameras and corresponding mirrors in their fields of view may be arranged according to a layout that ensures that every area of the materials facility has video monitoring coverage at all times. For example, in some embodiments each video camera in a grid of video cameras installed on the ceiling of the materials handling facility may be configured to provide coverage for a particular section of a main aisle (e.g., a section that is 25 feet long), and may provide coverage for that section of the main aisle as well as any side aisles in the field of view of mirrors in that section of the main aisle. In some embodiments, an array of video cameras and mirrors may be mounted on the ceiling of the facility, and/or a series of such components may be mounted on walls, floors, poles, or shelving units within the facility. The video cameras may be networked together (e.g., wirelessly or by wire) and may be configured to communicate with a control system, such as to receive messages from the control system that include instructions executable on the cameras to turn the cameras on or off, to adjust their resolution and/or frame rates, or to perform other adjustments to the system, in some embodiments. Similarly, the video cameras may be configured to communicate with local or backend server to send image data for storage and/or post-processing. A control system or server may communicate with the video cameras of a video-based monitoring and image post-processing system according to any of a number of different communication protocols, such as via TCP/IP, HTTP, 802.11, Bluetooth, etc., in various embodiments.

In some embodiments, the video-based monitoring and image post-processing system may employ high-end video cameras that include digital signal processing (DSP) capability. In such embodiments, some or all of the post-processing described herein may be performed on the cameras themselves. For example, these video cameras may be able to divide the captured image data into different streams based on a pre-determined mapping of pixel areas to mirrors in the field of view of the cameras, to applying a focusing operation on captured image frames, and/or to perform basic video analysis tasks (e.g., pattern matching, color matching, or motion detection), in some embodiments. In other embodiments, a server or other computer that is a component of the video-based monitoring and image post-processing system may accept video footage from one or more video cameras and may perform some or all of the post-processing operations described herein on that footage. In some embodiments in which some post-processing operations can be performed on the camera, they may be performed prior to compressing the footage and getting it off the camera (e.g., prior to moving it to a server for further processing and/or to a storage device). In embodiments in which the post-processing operations are performed on another component of the video-based monitoring and image post-processing system, the data may be compressed on the camera, sent to the other component, and decompressed by other component in order to perform the post-processing, after which it may be re-compressed. For example, a backend server may receive video streams from a camera, post-process them to produce multiple video streams of virtual cameras represented by the mirrors, and store the video streams corresponding to the virtual cameras in association with an identifier of the virtual camera, the corresponding mirror, the inventory area(s) in the field of view of the virtual camera, and/or the items stored in the inventory area(s) in the field of view of the virtual camera. In some embodiments, image data captured by the cameras may initially be sent to a local server (e.g., as it is captured), and may be subsequently sent to a backend server for post-processing and/or longer term storage purposes.

As previously noted, by employing a combination of video cameras and mirrors in a video-based monitoring and image post-processing system, the number of cameras needed may be greatly reduced when compared to video-based monitoring systems that do not include mirrors. The number of cameras and mirrors, and the corresponding coverage of the system may be dependent on and/or limited by the amount of available light in the facility. A plenoptic camera may be particularly well suited for us in embodiments in which, due to the layout of the facility, the mirrors are different distances from the camera. For example, there may not be enough light in a materials handling facility (e.g., a warehouse) to be able to capture image information with a standard camera such that the images reflected in multiple mirrors are usable for security and/or loss prevention operations (because of the aperture that would be needed to get everything in focus). However, a plenoptic camera may be able to capture enough image information to produce suitable results.

Figure 4:
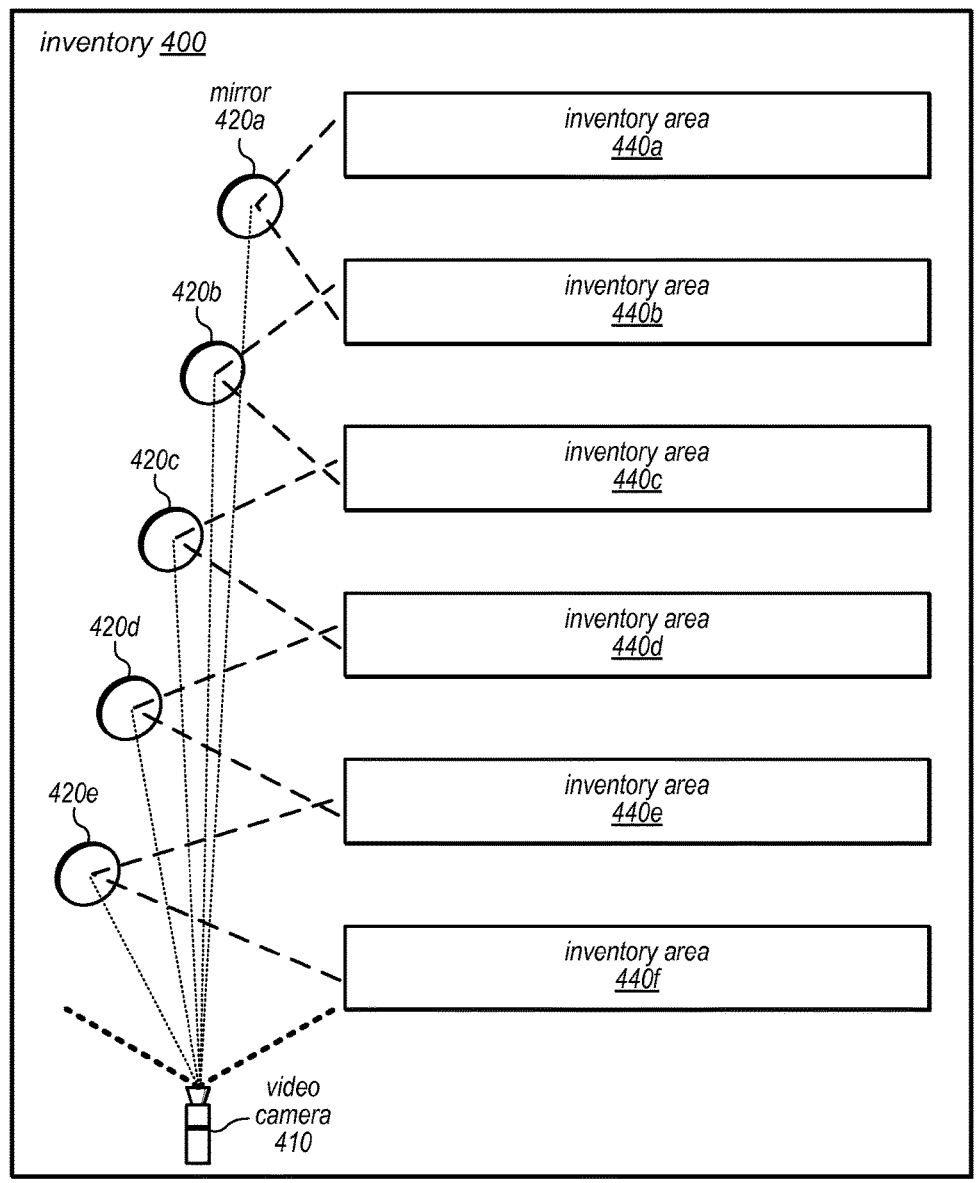
FIG. 4 is a block diagram illustrating a portion of a materials handling facility in which multiple mirrors are in the field of view of a single camera, according to one embodiment.

FIG. 4 is a block diagram illustrating a top view of a portion of a materials handling facility in which multiple mirrors are in the field of view of a single camera, according to one embodiment. In this example, one camera on a main aisle of a materials handling facility has in its field of view five angled mirrors, each of which is located at the end of a respective side aisle (e.g., an aisle in which items are stored in inventory areas on either side of the aisle). Thus, the number of cameras needed to provide video monitoring in this portion of the facility may be reduced by a factor of five, when compared to a system in which there is a dedicated camera for each side aisle. In this example, the aisle spacing may be on the order of five feet (e.g., with a spacing of three feet between the rows of racks or shelving units, each of which is two feet deep). In this example, the mirrors are mounted on the ceiling and are offset from each other in height and/or planar dimensions so that they are all visible (simultaneously) to the camera. The camera is installed overhead and is pointing at the mirrors on the ceiling at the end of side aisles, with the camera positioned at a slight angle and a little below the mirrors (e.g., on the order of six inches) so that all five mirrors are in its field of view. With such an arrangement, the camera can "see", for each side aisle, the inventory areas on both sides of the aisle, the floor, and any agent of the facility (e.g., a person or a piece of automated equipment) that is working in or passing through the aisle in the images reflected in the corresponding mirror.

In the example illustrated in FIG. 4, the portion of the facility that is directly in the field of view of video camera 410 (represented by the thick dotted lines emanating from the camera) may be considered a main aisle, while the aisles between various pairs of inventory areas 420a-420f may be considered side aisles. In different embodiments, each of the inventory areas 420a-420f may include a single long shelving unit or rack of bins, multiple shelving units or racks of bins, or in general any suitable structural elements for storing items in inventory. In this example, the field of view of video camera 410 includes the main aisle and also encompasses a view of the images reflected in each of mirrors 420a-420e. The reflections of these images back to video camera 410 are represented in FIG. 4 by the thinner dotted lines between the camera and the mirrors 420a-420e.

As illustrated in FIG. 4, each of the mirrors 420a-420e has a different portion of the facility in its field of view (represented by the dashed lines emanating from each of the mirrors), at least some of which is not directly in the field of view of video camera 410. For example, the field of view of mirror 420a includes a portion of the main aisle, at least a portion of inventory areas 440a and 440b, and the side aisle between inventory areas 440a and 440b. Similarly, the field of view of mirror 420b includes a portion of the main aisle, at least a portion of inventory areas 440b and 440c, and the side aisle between inventory areas 440b and 440c; the field of view of mirror 420c includes a portion of the main aisle, at least a portion of inventory areas 440c and 440d, and the side aisle between inventory areas 440c and 440d; the field of view of mirror 420d includes a portion of the main aisle, at least a portion of inventory areas 440d and 440e, and the side aisle between inventory areas 440d and 440e; and the field of view of mirror 420e includes a portion of the main aisle, at least a portion of inventory areas 440e and 440f, and the side aisle between inventory areas 440e and 440f.

In this example, each of the mirrors 420a-420f may represent a virtual camera that is trained on one of the side aisles, and the video-based monitoring and image post-processing system may generate (from image data captured by video camera 410) different video streams representing images captured by each of these virtual cameras. Note that in the example illustrated in FIG. 4, the fields of view of adjacent pairs of mirrors overlap. However, in other embodiments, the fields of view of the mirrors in the system may be non-overlapping. Note also that the arrangement of the camera and mirrors illustrated in FIG. 4 is just one example of an arrangement of cameras and mirrors in a materials handling facility, and that many other arrangements of cameras and mirrors within materials handling facilities of the same or a different type are possible.

Figure 5A:
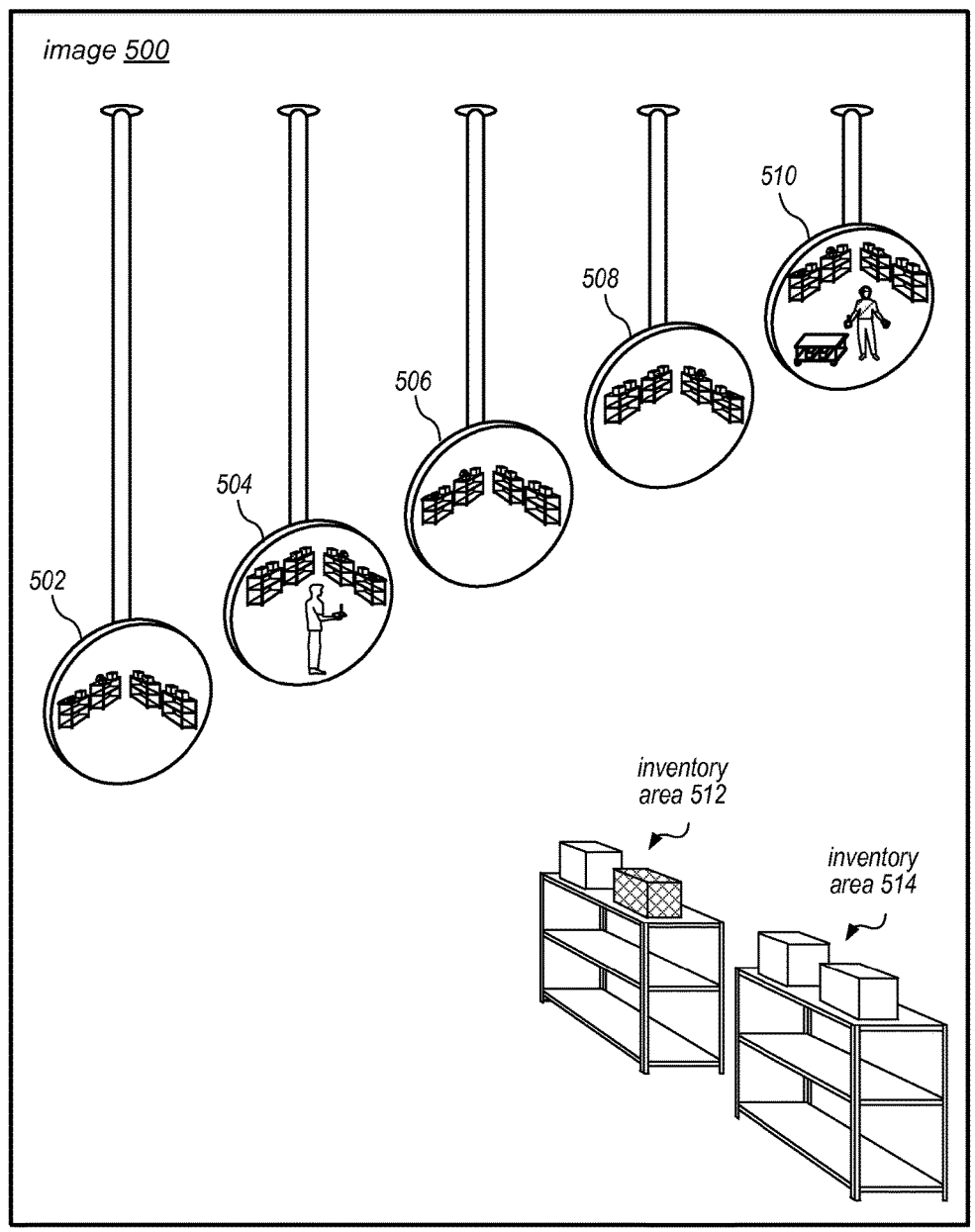
FIG. 5A illustrates an example image captured by a camera, according to one embodiment.

One example of an image captured by a camera (e.g., a single image or a single frame of a video stream) when the field of view of the camera includes multiple mirrors suspended from the ceiling of a materials handling facility (each of which is trained on a different portion of the facility) is illustrated in FIG. 5A. In this example, one portion of image 500 depicts inventory areas in direct view of the camera (e.g., along a main aisle), shown as inventory areas 512 and 514. Other portions of image 500 depict the mirrors that are in the field of view of the camera, including the images reflected in those mirrors, from the perspective of (i.e., as seen by) the camera. For example, one portion of image 500 includes an image of a side aisle of the facility that is reflected in mirror 502. In this example, the reflected image of the side aisle includes several shelving units (or inventory areas). Similar images (e.g., images of other side aisles that include shelving units or inventory areas) are included in the portions of image 500 depicting the images reflected in mirrors 506 and 508. Another portion of image 500 includes an image of a side aisle of the facility that is reflected in mirror 504. In this example, the reflected image of this side aisle includes several shelving units (or inventory areas) and an agent of the facility who is carrying a communication device. Still another portion of image 500 includes an image of a side aisle of the facility that is reflected in mirror 510. In this example, the reflected image of this side aisle includes several shelving units (or inventory areas), an agent of the facility, and a pushcart.

Figure 5B:
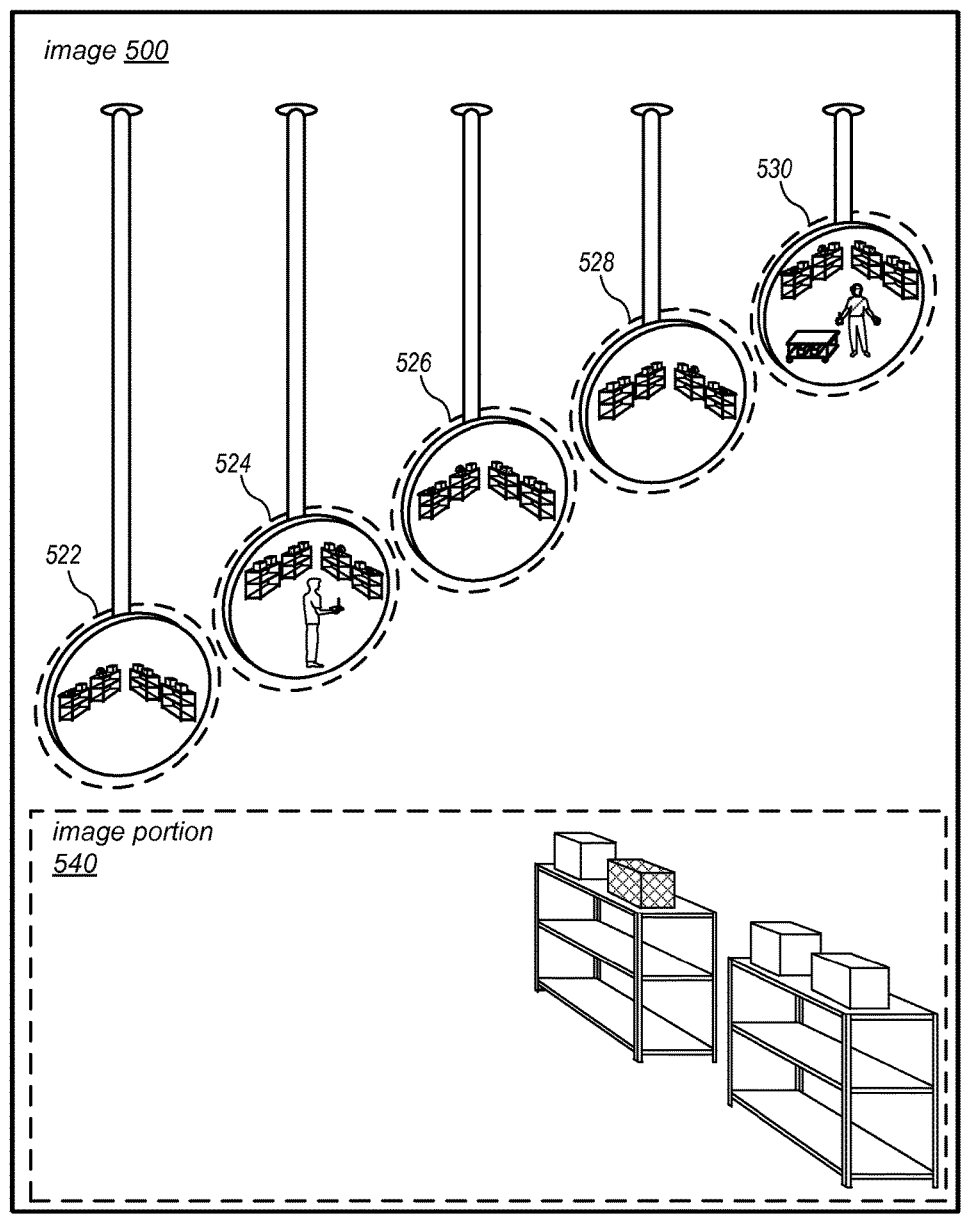
FIG. 5B illustrates various portions of the example image shown in FIG. 5A that may be processed separately, according to one embodiment.

As described herein, in some embodiments, image data captured by a camera when multiple mirrors are in its field of view (e.g., a plenoptic camera) may be processed to extract, adjust the focus of, and/or otherwise correct the images reflected in those mirrors to generate image data that appears as if it were captured by a virtual camera at the location of the mirror. FIG. 5B illustrates various portions of the example image 500 shown in FIG. 5A that may be processed separately, according to one embodiment. In this example, portions of the image that encompasses each of the mirrors may be extracted from the image (e.g., according to a pre-determined mapping between the locations/orientations of the mirrors, and the portions of the captured images that contain those mirrors). Specifically, the portion of image 500 that includes mirror 502 shown in FIG. 5A is shown in FIG. 5B as the area bounded by the dashed line labeled 522. Similarly, the portion of image 500 that includes mirror 504 shown in FIG. 5A is shown in FIG. 5B as the area bounded by the dashed line labeled 524; the portion of image 500 that includes mirror 506 shown in FIG. 5A is shown in FIG. 5B as the area bounded by the dashed line labeled 526; the portion of image 500 that includes mirror 508 shown in FIG. 5A is shown in FIG. 5B as the area bounded by the dashed line labeled 528; and the portion of image 500 that includes mirror 510 shown in FIG. 5A is shown in FIG. 5B as the area bounded by the dashed line labeled 530. In this example, the distances between the mirrors and the camera are different. Therefore, a focusing operation applied to the image data for the pixels in each of the differently labeled portions of image 500 may be used to focus that portion of the image at a different depth. As described above, in some embodiments, image data from a plenoptic camera may be post-processed to focus an image (or a portion thereof) at a particular depth, based on the four-dimensional light-field information embedded in the image data output by the plenoptic camera. In other words, in some embodiments, each of these portions 522-530 of image 500 may be processed separately to generate a video stream that is focused on the image reflected in particular mirror in order to provide video monitoring in and around a particular side aisle in the materials handling facility.

As described herein, portions of an image that depict items (agents, etc.) that are directly in the field of view of the camera when capturing the image may be processed separately in order to extract, adjust the focus of, and/or otherwise correct those portions of the image. In the example illustrated in FIG. 5B, image portion 540 of image 500 depicts a portion of the main aisle that is directly (and entirely) in the field of view of the camera. Specifically, image portion 540 depicts inventory areas 512 and 514 shown in FIG. 5A. In some embodiments, this portion of image 500 may be processed separately from image portions 522-530 (and separately from any other portions of image 500 for which items of interest are at different distances from the camera) to provide video monitoring in and around at least a portion of the main aisle in the materials handling facility.

Figure 6:
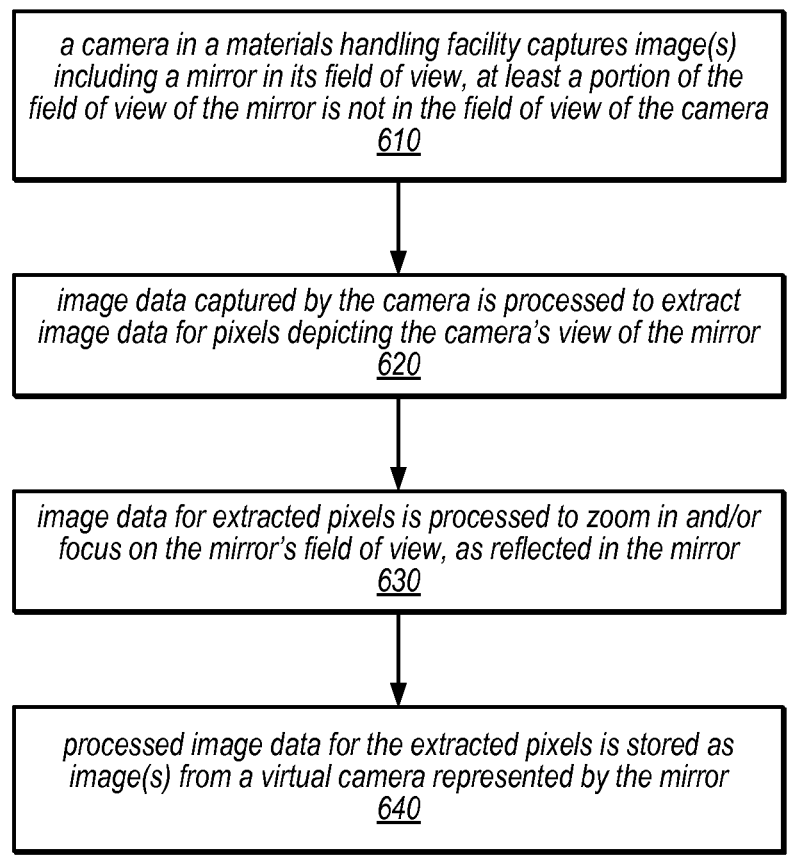
FIG. 6 is a flow diagram illustrating one embodiment of a method for using a camera and a mirror to capture images of a portion of a materials handling facility that is not in the field of view of the camera.

One embodiment of a method for using a camera and a mirror to capture images of a portion of a materials handling facility that is not directly in the field of view of the camera is illustrated in the flow diagram in FIG. 6. As illustrated at 610, in this example, the method may include a camera in a materials handling facility capturing one or more image(s) that include a mirror in the field of view of the camera, where at least a portion of the field of view of the mirror is not in the field of view of the camera. For example, the image(s) may include a single image, a sequence of single images captured by a still camera (e.g., at a frame rate approaching that of a video camera), or a sequence of frames captured by a video camera, in different embodiments. As described herein, the camera may be a standard camera or a plenoptic camera, and the mirror may be flat, curved, or spherical, in different embodiments.

As illustrated in this example, the method may include processing image data captured by the camera to extract image data for pixels depicting the camera's view of the mirror (i.e., the image reflected in the mirror, as seen by the camera), as in 620. For example, image data captured by the camera may be communicated to a server on which an image processing application is executing, and the image processing application may be configured to cut out of the captured image data the image data corresponding to the pixels that collectively represent the mirror (including the image reflected thereon). In some embodiments, the image processing application may be configured to extract image data for pixels within a pre-defined pixel boundary that is mapped to the mirror (where the boundary corresponds to an edge of the mirror) from each image or video frame captured by the camera, one at a time. In other embodiments, the image processing application may be configured to detect pixels that represent the mirror in the image data (e.g., by analyzing the image data to detect pixels representing the edge of the mirror or a border around the mirror, to detect a pre-defined color or pattern applied to the mirror or to its edge/border, and/or by other means) and to extract image data for the pixels within the detected edge/border. In different embodiments, the image processing application or an extraction operation thereof may be automatically invoked in response to the server receiving the image data or may be explicitly invoked by a user.

As illustrated in this example, the method may also include processing the image data for the extracted pixels to zoom in on and/or focus on the portion of the captured image representing the mirror's field of view, as reflected in the mirror (as in 630). For example, an image processing application executing on the server (or a focusing operation thereof) may be automatically invoked in response to receiving the data or explicitly invoked by a user), in different embodiments. In some embodiments, the focusing operation may include digitally zooming in on that portion of the image, and (if camera is a plenoptic camera), applying a focusing operation on that portion of the image, e.g., to sharpen it. In some embodiments, processing the image data may include reducing the focus in a portion of the image data (e.g., to blur the appearance of a face that is visible in the reflected image due to applicable privacy regulations or policies). The method may include storing the processed image data for the extracted pixels as image(s) from a virtual camera represented by the mirror, as in 640. For example, each virtual camera may be labeled and/or identified (and/or its image data indexed) according to the location or identifier of the corresponding mirror or by the location or an identifier of an aisle or the portion of the facility visible in the images reflected in the mirror. In some embodiments, the processed image data may be mapped or cross-referenced to the items stored there (e.g., in a product database). While the example illustrated in FIG. 6 includes only a single mirror, in other embodiments the operations illustrated in FIG. 6 may be applied to multiple cameras (and corresponding virtual cameras) in such a facility.

Figure 7:
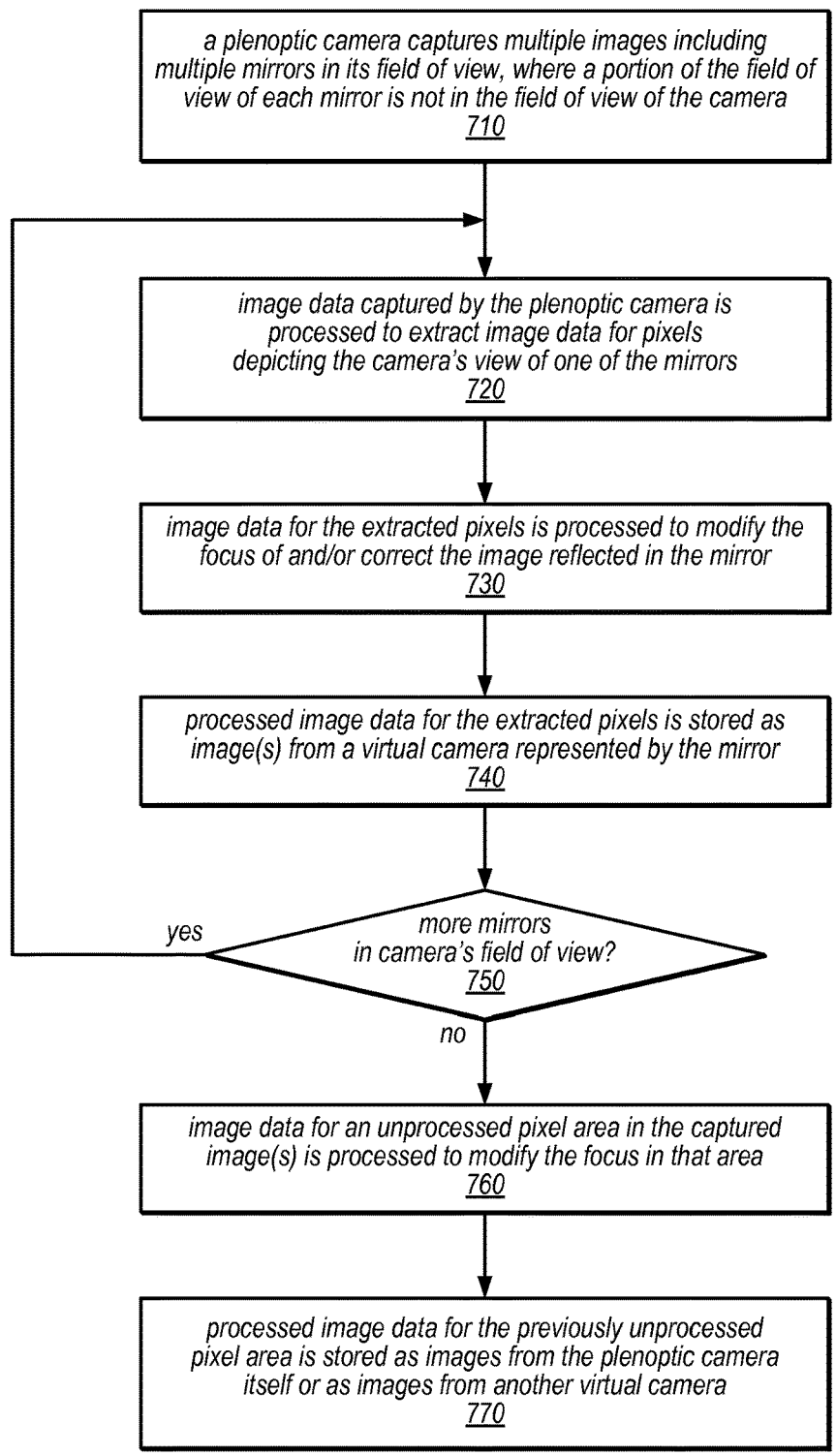
FIG. 7 is a flow diagram illustrating one embodiment of a method for using a plenoptic camera and multiple mirrors to capture images in different areas of a materials handling facility.

One embodiment of a method for using a plenoptic camera and multiple mirrors to capture images in different areas of a materials handling facility is illustrated by the flow diagram in FIG. 7. As illustrated at 710, in this example, the method may include a plenoptic camera capturing multiple images, each of which includes multiple mirrors in its field of view, where at least a portion of the field of view of each mirror is not in the field of view of the camera. For example, in a materials handling facility in which mirrors are positioned along a main aisle at the ends of multiple side aisles, and one camera is trained on several of these mirrors, the majority of each of the side aisles may not be directly in the field of view of the camera. However, a portion of the field of view of each mirror may overlap the field of view of the camera, and/or a portion of the field of view of the camera may overlap with the fields of view of one or more other camera(s) that are primarily trained on other mirrors in the facility. In various embodiments, the images may include a sequence of single images captured by a still camera (e.g., at a frame rate approaching that of a video camera), or a sequence of frames captured by a video camera. As described herein, the mirrors may be flat, curved, or spherical, in different embodiments.

As illustrated in this example, the method may include processing the image data captured by the plenoptic camera to extract image data for pixels of the image that depict the camera's view of one of the mirrors (including the image reflected in the mirror, as seen by the camera), as in 720. For example, in some embodiments, an image processing application (or an extraction operation thereof) may be configured to digitally zoom in on an area bounded by an edge of the mirror (e.g., it may upsample the image using any of a variety of techniques), or may cut out the image data for the pixels that collectively represent the mirror (including the images reflected therein). The method may also include processing the image data for the extracted pixels to modify the focus of and/or correct the image reflected in the mirror, as in 730. For example, the image processing application (or a focusing operation thereof) may be configured to select image data for particular pixels in each of an array of micro-images captured by a plenoptic camera to focus the extracted portion of the image data at a particular depth (dependent on the distance between the mirror and the camera). In some embodiments, modifying the focus may include reducing the focus in a portion of the image data (e.g., to blur the appearance of a face that is visible in the reflected image due to applicable privacy regulations or policies). In some embodiments, the image processing application (or a focusing or de-warping operation thereof) may be configured to correct any distortions due to the shape and/or curvature of the mirror (e.g., making circular images flat and/or reversing the images that are reflected in the mirror) using any of a variety of distortion correction techniques. As in the previous example, the method may include storing the processed image data for the extracted pixels as image(s) from a virtual camera represented by the mirror (as in 740). For example, each virtual camera may be labeled and/or identified (and/or its image data indexed) according to the location or identifier of the corresponding mirror or by the location or an identifier of an aisle or the portion of the facility visible in the images reflected in the mirror, and the processed image data may be mapped or cross-referenced to the items stored there (e.g., in a product database).

If there are more mirrors in the camera's field of view (shown as the positive exit from 750), the method may include repeating the operations illustrated at 720-740 to process image data corresponding to the images reflected in each of those mirrors. This is illustrated in FIG. 7 as the feedback from 750 to 720. Once image data corresponding to the images reflected in all of the mirrors in the camera's field of view has been processed or if only one mirror is included in the camera's field of view (shown as the negative exit from 750), the method may include processing image data for an unprocessed pixel area of the images (e.g., a portion of the images corresponding to a portion of the camera's field of view that does not include a mirror) to modify the focus in that area of the captured images, e.g., to sharpen and/or reduce focus in various portions of that area (as in 760) and storing the processed image data for the previously unprocessed pixel area as images from the plenoptic camera itself (e.g., as images depicting the portion of the facility that is directly in the camera's field of view) or as images from another virtual camera, as in 770. In some embodiments, the image processing application may be configured to process the image data only for the portions of the image that do not represent the mirrors (e.g., everything except the extracted portion of the image data), or may be configured to process the image data for the entire image at once (e.g., by selecting particular pixels from the array of micro-images to construct an image that is focused everywhere, with different portions being focused at different depths). In general, in the example illustrated in FIG. 7, the method includes first extracting image data corresponding to different mirrors as virtual cameras, and then applying separate focusing and/or de-warping operations to the image data for each virtual camera.

Figure 8:
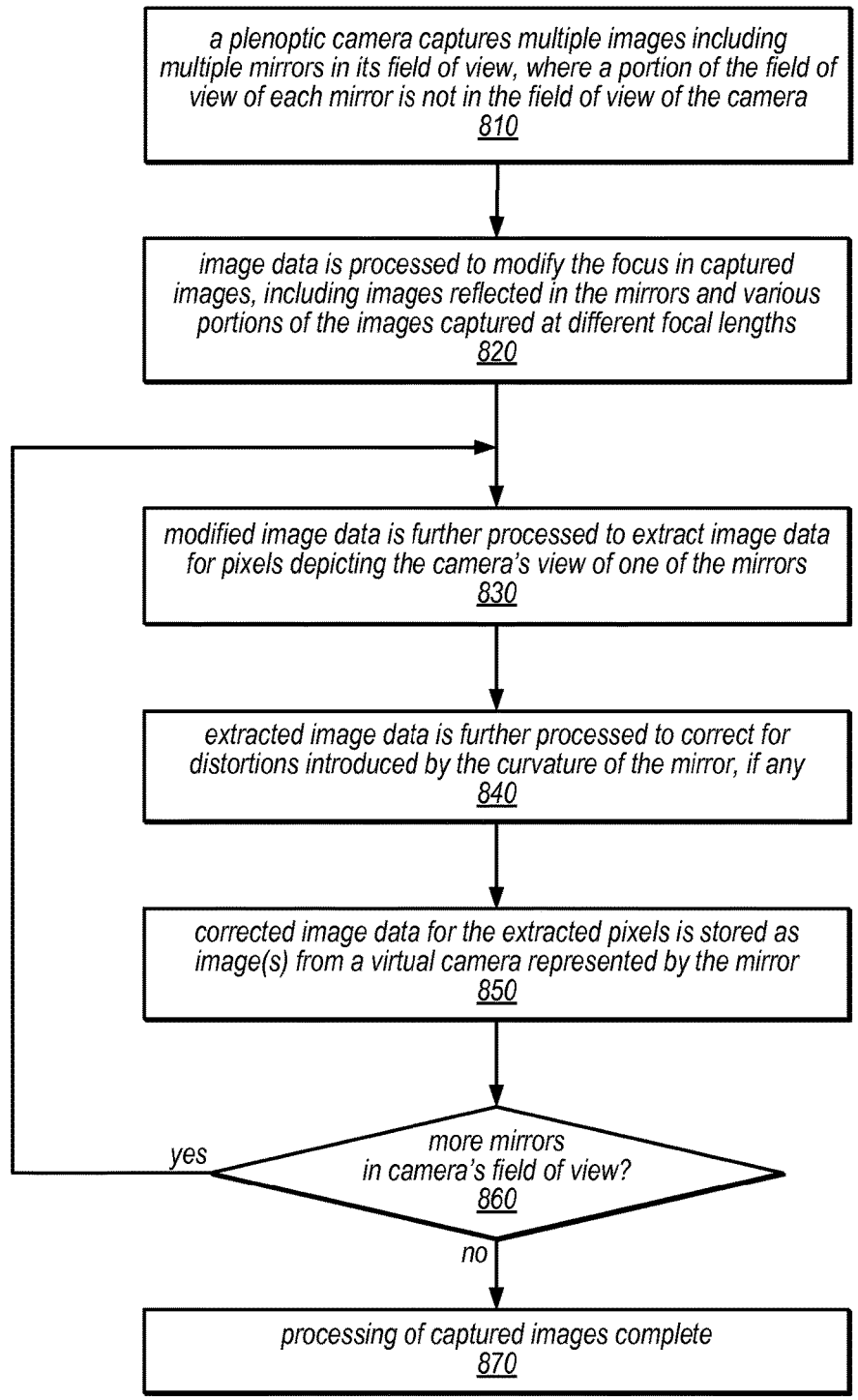
FIG. 8 is a flow diagram illustrating another embodiment of a method for using a plenoptic camera and multiple mirrors to capture images in different areas of a materials handling facility.

Another embodiment of a method for using a plenoptic camera and multiple mirrors to capture images in different areas of a materials handling facility is illustrated in FIG. 8. As in the previous example, the method may include a plenoptic camera capturing multiple images, each of which includes multiple mirrors in its field of view, where at least a portion of the field of view of each mirror is not in the field of view of the camera, as in 810. For example, in a materials handling facility in which mirrors are positioned along a main aisle at the ends of multiple side aisles, and one camera is trained on several of these mirrors, the majority of each of the side aisles may not be directly in the field of view of the camera. However, a portion of the field of view of each mirror may overlap the field of view of the camera, and/or a portion of the field of view of the camera may overlap with the fields of view of one or more other camera(s) that are primarily trained on other mirrors in the facility. In various embodiments, the images may include a sequence of single images captured by a still camera (e.g., at a frame rate approaching that of a video camera), or a sequence of frames captured by a video camera. As described herein, the mirrors may be flat, curved, or spherical, in different embodiments.

In this example, the method may include processing the image data to modify the focus in the captured images, including portions of the images corresponding to images reflected in the mirrors and various portions of the images that have been captured at different focal lengths, as in 820. For example, an image processing application (or a focusing operation thereof) may be configured to process the image data for the entire image at once (e.g., by selecting particular pixels from the array of micro-images to construct an image that is focused everywhere, with different portions being focused at different depths). In some embodiments, modifying the focus may include reducing the focus in a portion of the image data (e.g., to blur the appearance of a face that is visible in the reflected image due to applicable privacy regulations or policies). As noted above, in some embodiments, the image processing application may be configured to detect pixels that represent mirrors in the image data (e.g., by detecting pixels representing the edge of a mirror or a border around a mirror, detecting a pre-defined color or pattern applied to a mirror or to its edge/border, and/or by other means) and to extract image data for pixels within a detected mirror/edge/border. In such embodiments, the image processing operation illustrated at 820 may include searching for such indications of the presence of one or more mirrors within different focal ranges, and separately modifying the focus in each portion of the image data that represents an image reflected in an identified mirror in order to bring each of those reflected images into focus. In embodiments in which the actual (physical) sizes of multiple mirrors that are visible in the captured image data are known to be the same, the relative sizes of the representations of those mirrors in the captured image data may be used to determine the distances between the mirrors and/or between each of the mirrors and the camera. In some embodiments, the output of this focusing operation may be stored as a modified image from the plenoptic camera.

As illustrated at 830, in this example, the method may include further processing the modified image data to extract image data for pixels depicting the camera's view of one of the mirrors. For example, in some embodiments, an image processing application (or an extraction operation thereof) may be configured to digitally zoom in on an area bounded by an edge of the mirror (e.g., it may upsample the image using any of a variety of techniques), or may cut out the image data for the pixels that collectively represent the mirror (including the images reflected therein). As described herein, the image processing application may be configured to extract image data for pixels within a pre-defined pixel boundary that is mapped to the mirror (where the boundary corresponds to an edge of the mirror) or to extract image data for pixels within a mirror/edge/border that is detected in the image data by the image processing application, in different embodiments. The method may also include processing the extracted image data to correct for distortions introduced by the shape and/or curvature of the mirror, if any, as in 840. In some embodiments, the image processing application (or a focusing or de-warping operation thereof)

may be configured to correct any distortions due to the shape and/or curvature of the mirror (e.g., making circular images flat and/or reversing the images that are reflected in the mirror) using any of a variety of distortion correction techniques.

As illustrated at 850, in this example, the method may include storing the corrected image data for the extracted pixels as image(s) from a virtual camera represented by the mirror. For example, each virtual camera may be labeled and/or identified (and/or its image data indexed) according to the location or identifier of the corresponding mirror or by the location or an identifier of an aisle or the portion of the facility visible in the images reflected in the mirror, and the processed image data may be mapped or cross-referenced to the items stored there (e.g., in a product database). If there are more mirrors in the camera's field of view (shown as the positive exit from 860), the method may include repeating the operations illustrated at 830-850 for each of the other mirrors. Otherwise (or once these operations have been repeated to extract and correct image data for each of the other mirrors), shown as the negative exit from 860, the processing of the captured images may be complete (as in 870). In general, in the example illustrated in FIG. 8, the method includes first applying a focusing operation on an entire image, and then extracting image data corresponding to different mirrors as virtual cameras.

As previously noted, the video-based monitoring and image post-processing system described herein may include cameras that capture and/or record images, mirrors that reflect areas that are otherwise outside the fields of view of the cameras, and local and/or backend servers that receive and/or store raw and/or generated video footage. The system may also include a programming interface and an image processing application (e.g., one that executes on a local or backend server) that performs the post-processing operations described herein. In some embodiments, the system may include memory in which to store various mappings between the pixels of images captured by various cameras and the mirrors represented by those pixels, as well as information indicating the locations of the cameras, mirrors, areas, and/or items in the facility in which the system is employed. In some embodiments, a camera may capture images and send image data corresponding to those images to a local server, which may tag (or otherwise associate) the image data with an identifier of the camera. The local server may then send the tagged information to a backend server for post-processing, which may be dependent on a mapping (e.g., a pre-defined mapping between pixels in images captured by the camera and corresponding mirrors) that is indexed and/or accessed based on the tag. Once the image data has been post-processed to generate different video streams for each mirror as a virtual camera, the generated video streams may be tagged by an identifier of the virtual camera (e.g., as "footage from virtual camera 1" or "footage from mirror 2.3").

Figure 9:
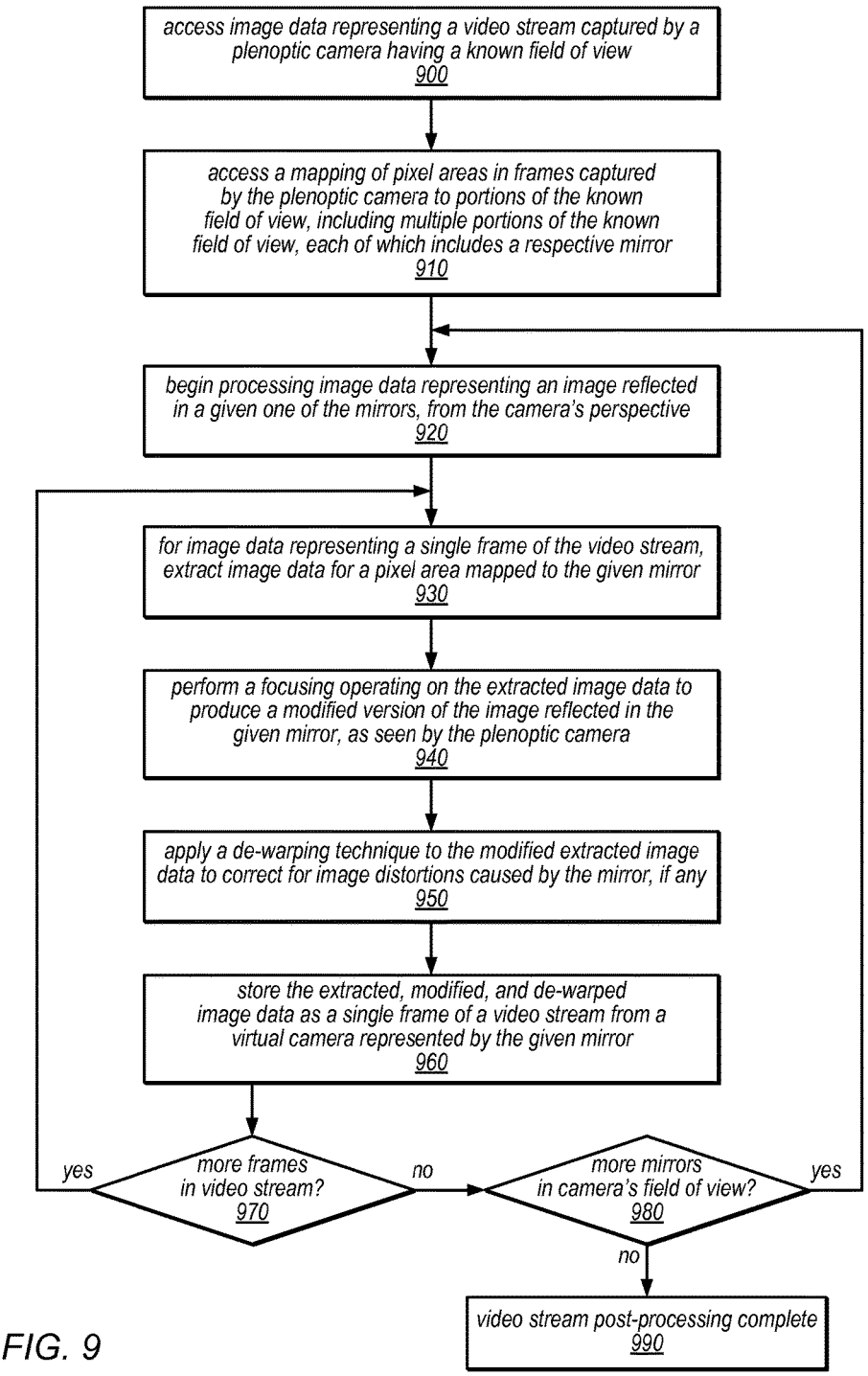
FIG. 9 is a flow diagram illustrating one embodiment of a method for post-processing image data captured by a plenoptic camera in a materials handling facility to extract video streams corresponding to multiple virtual cameras.

One embodiment of a method for post-processing image data captured by a plenoptic camera in a materials handling facility to extract video streams corresponding to multiple virtual cameras is illustrated by the flow diagram in FIG. 9. As illustrated in this example, the method may include accessing image data representing a video stream captured by a plenoptic camera having a known field of view, as in 900. In this example, the video stream may represent the raw output of the plenoptic camera, or may represent a compressed version of the raw output (which may be decompressed before post-processing). In various embodiments, the video stream may have been captured by a video camera or may represent a sequence of single images captured by a still camera (e.g., at a frame rate approaching that of a video camera). As described herein, the mirrors may be flat, curved, or spherical, in different embodiments. The method may also include accessing a pre-determined mapping of pixel areas in frames captured by the plenoptic camera to portions of the known field of view of the camera, including multiple portions of the known field of view, each of which includes a respective mirror, as in 910. For example, in some embodiments, based on the location, position, and/or orientation of the camera and the mirrors, it may be determined which pixels in an image captured by the camera will include image data corresponding to each of the mirrors and the images they reflect, and this information may be maintained by the system for subsequent access by the post-processing operations. In other embodiments, such a mapping may be generated following the detection of pixel areas that represent mirrors in the image data (e.g., by detection of their edges or border, or by detection of a pre-defined color or pattern that is applied to mirrors or to their edges/borders). As noted above, the system may also maintain a mapping between identifiers of the mirrors and to inventory areas and/or aisles, which may in turn be mapped (or cross-referenced) to a product database indicating the particular items that are stored in those areas and which should be visible in the portion of the image.

As illustrated in FIG. 9, the method may include beginning processing image data that represents an image reflected in a given one of the mirrors, as in 920. Processing the image data corresponding to the given mirror may include, for image data representing a single frame of the video stream captured by the camera, extracting image data for a pixel area mapped to the given mirror, as in 930; applying a focusing operation (such as those described herein) on the extracted image data to produce a modified version of the image reflected in the given mirror, as seen by the plenoptic camera (as in 940); and applying a de-warping technique to the modified extracted image data to correct for image distortions caused by the mirror, if any (as in 950). The method may also include storing the extracted, modified, and de-warped image data as a single frame of a video stream from a virtual camera represented by the given mirror, as in 960. For example, each virtual camera may be labeled and/or identified (and/or its image data indexed) according to the location or identifier of the corresponding mirror or by the location or an identifier of an aisle or the portion of the facility visible in the images reflected in the mirror. If the processed image data is mapped or cross-referenced to the items stored there (e.g., in a product database), this information may be accessed by other operations within the facility to identify the footage (from a particular virtual camera) in which a particular item (or the handling of the item) is visible. In other words, various one of the labels and/or mappings described herein may be accessed in response to a request to view an image of a particular item or inventory area in order to locate the appropriate footage. Note that the raw or processed image data, including any video streams generated from the perspective of a virtual camera, may also be tagged with other information by the system, including time stamps.

As illustrated in FIG. 9, if there are more frames in the video stream (shown as the positive exit from 970), the method may include repeating the operations shown as 930-960 for each frame. Once all of the frames in the captured video stream have been processed to produce a video stream for the virtual camera represented by the given mirror (shown as the negative exit from 970), the method may include repeating the operations shown as 920-960 for each other mirror in the camera's field of view, if any. This is illustrated in FIG. 9 by the feedback from 980 to 920. If there are no other mirrors in the camera's field of view (or once image data corresponding to each of the other mirrors has been processed), shown as the negative exit from 980, the post-processing of the captured video stream may be complete, as in 990. Note that in different embodiments, the operations illustrated in FIG. 9 may be performed in a different order. For example, in one embodiment, each frame of the image data may be processed (extracting image data and focusing on different mirrors visible in the frame to generate image data for a different virtual camera stream) before processing any of the image data for the next frame. In such an embodiment, each frame may be post-processed once it is received, while additional frames are being captured and/or sent to the server that is performing the post-processing.

Although many of the examples described herein involve the use of a video-based monitoring and image post-processing system in picking and/or stowing operations of a materials handling facility, a video-based monitoring and image post-processing system may also be used in other operations within the facility. For example, video-based monitoring may be employed in a receiving operation, a sorting operation, a packing operation and/or a shipping operation for security and/or loss prevention purposes. In some embodiments, the cameras of the video-based monitoring and image post-processing system described herein may be placed within the facility in high-value or high-risk areas, and mirrors may be placed within the fields of view of those cameras to provide coverage in nearby areas that are at lower risk for security or loss. In some embodiments, an analysis of the video streams output by the physical camera and generated for the virtual cameras may be performed periodically in order to determine whether the cameras and/or the mirrors have been moved, re-oriented, damaged, or modified (e.g., by determining whether a threshold on the amount of change in the images from the cameras or virtual cameras has been exceeded).

A video-based monitoring and image post-processing system, as described herein, may be utilized in a number of different facilities and situations, including, but not limited to material handling facilities, order fulfillment centers, rental centers, distribution centers, packaging facilities, shipping facilities, libraries, museums, warehouse storage facilities, shopping centers, grocery stores, car parking lots, office buildings, prisons, etc., or in general in any large facility in which video monitoring is desired, but costs must be contained. In some embodiments, the video-based monitoring and image post-processing system may be applied in outdoor situations. For example, in order to monitor the operations of loading or receiving docks, instead of putting cameras on poles out in a parking lot to monitor trucks parked at the docks, cameras may be installed on the building near the doors (where they may be protected from the weather and/or vandalism), and mirrors may be installed on poles in various locations in the parking lot or along a driveway area facing the docks. In this way, a camera may capture images of the front of a truck that is backed up to the facility (e.g., to observe the driver, capture license plate information, etc.) in the reflection in one of the mirrors. In one such embodiment, all sides of one or more trucks may be visible using one camera and multiple mirrors. In other embodiments, the video-based monitoring and image post-processing systems described herein may be used in military or police applications, where it may not be possible (or desirable) to install a large number of expensive video cameras. Applications of these systems in transportation may include installing a combination of cameras and mirrors on the inside or outside of trains, busses, airplanes, rockets, or space shuttles to provide monitoring without the need to install a large number of expensive cameras. They may also be used for monitoring traffic, e.g., by placing a single camera and multiple mirrors at an intersection to capture images in all directions. In general, the video-based monitoring and image post-processing systems described herein may be used anywhere in which it is difficult to monitor a space with a single line of sight.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of the control system, product database, display devices, and/or other communication devices).

Figure 10:
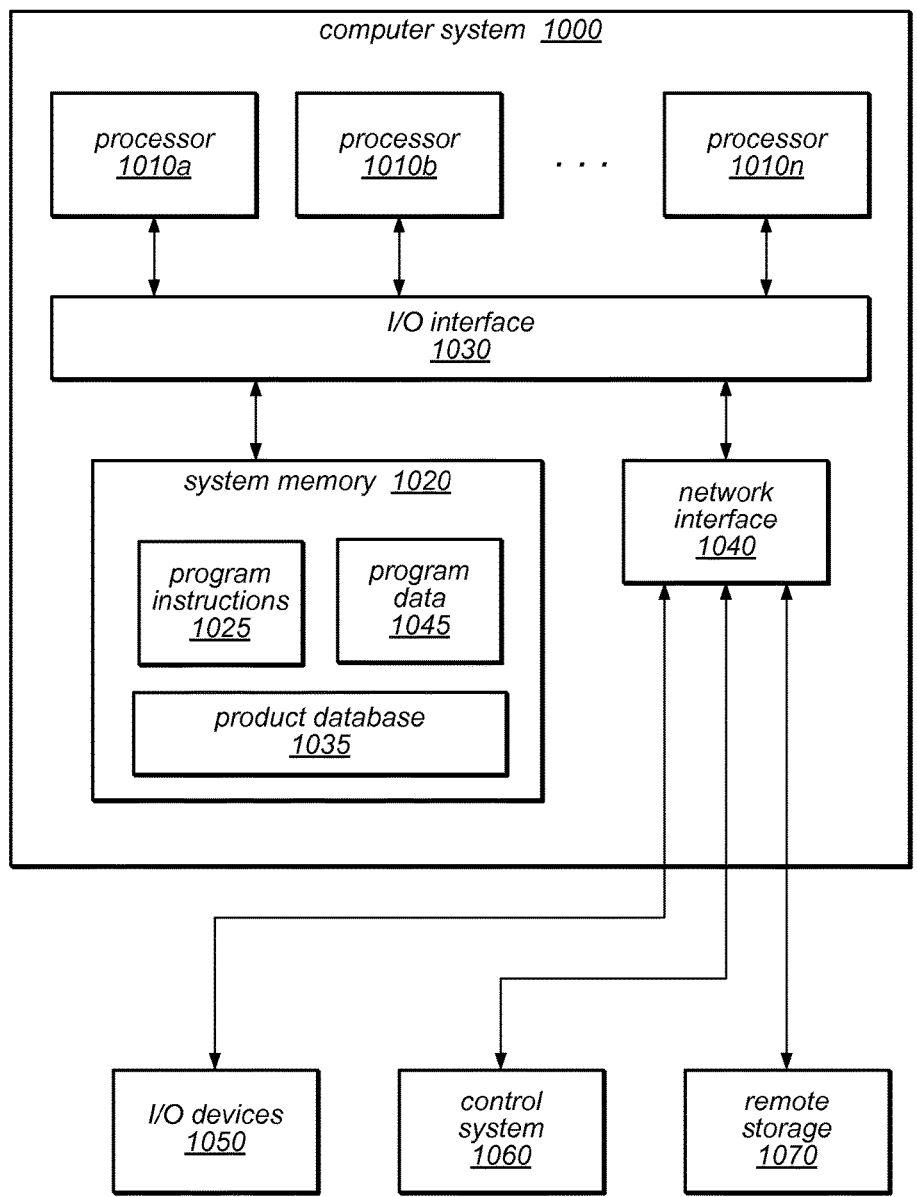
FIG. 10 is a block diagram illustrating a computer system that implements at least a portion of a video-based monitoring and image post-processing system in a materials handling facility, according to one embodiment.

Any of various computer systems may be configured to implement the video-based monitoring system and image post-processing methods described herein, in different embodiments. For example, in one embodiment the video-based monitoring and image post-processing system may be implemented using multiple network-enabled video cameras (including, for example, one or more plenoptic cameras) and corresponding servers, while in another embodiment, the video-based monitoring and image post-processing system may be implemented using multiple USB-enabled video cameras and one or more personal computer systems. FIG. 10 is a block diagram illustrating one embodiment of a computer system that implements at least a portion of a video-based monitoring and image post-processing system in a materials handling facility. For example, in various embodiments, an order fulfillment control system, a video-based monitoring and image post-processing system (or control portion thereof), a video camera of a video-based monitoring system, or a communication device used by various agents within a materials handling facility may each include a general-purpose computer system such as computer system 1000 illustrated in FIG. 10. In other words, in various embodiments, computer system 1000 may represent a computer system of a video camera (e.g., one that includes the functionally of a plenoptic camera) that performs some or all of the image post-processing operations described herein, or may represent a computer system that implements a server that receives video streams and other information from cameras in the facility (including, for example, one or more plenoptic cameras) and performs some or all of the image post-processing operations described herein.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of a video-based monitoring and image post-processing system, an order fulfillment control system, a communication device, or a video camera of a video-based monitoring and image post-processing system, while in other embodiments a video-based monitoring and image post-processing system, an order fulfillment control system, a communication device, or a video camera of a video-based monitoring and image post-processing system may include more, fewer, or different elements than those of computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for implementing a video-based monitoring and image post-processing system, an order fulfillment control system, a communication device, or a video camera of a video-based monitoring and image post-processing system, are shown stored within system memory 1020 as program instructions 1025. In some embodiments, system memory 1020 may include product database 1035, which may be configured as described herein. As described herein, product database 1035 may store mappings between various items in the facility and the inventory areas or aisles in which they are stored (and/or their specific positions within those inventory areas or aisles), which may also be mapped to particular cameras or virtual cameras (e.g., mirrors) in the facility whose fields of view include those items and/or corresponding inventory areas or aisles. In other embodiments, remote storage 1070 may include such a product database instead of, or in addition to, system memory 1020. For example, the information described herein as being stored in a product database may be partitioned between a database included in system memory 1020 and one or more databases included on one or more remote storage devices 1070, in various embodiments. In some embodiments, system memory 1020 (e.g., program data 1045 within system memory 1020) and/or remote storage 1070 may store mappings between particular pixel areas of images captured by each of the cameras employed in the system, the mirrors depicted in those pixel areas and/or the respective portions of the materials handling facility that are in the field of view of the mirrors, as described herein.

System memory 1020 (e.g., program data 1045 within system memory 1020) and/or remote storage 1070 may also store video streams captured by one or more video cameras of a video-based monitoring and image post-processing system, and/or video streams of virtual cameras represented by mirrors in the facility that have been generated using the image post-processing techniques described herein (e.g., techniques for extracting, adjusting the focus of, and/or otherwise correcting image data in pixel areas that correspond to the mirrors), in different embodiments. For example, in one embodiment, video stream data may be resident within system memory 1020 while it is actively being processed by program instructions 1025, and may be copied or moved to remote storage 1070 subsequent to active processing, according to various policies for retention and/or archiving of the video footage. For example, in some embodiments, all video footage output by the video-based monitoring and image post-processing system (whether captured directly by one of the physical cameras employed in the system or generated for a virtual camera using the post-processing techniques described herein) may be retained (e.g., in remote storage 1070) for at least a pre-defined short period of time (e.g., on the order of days or weeks), while some of the video footage may be retained for a pre-defined longer period of time (e.g., on the order of weeks or months) in order to analyze the footage in response to a breach of security, a loss of product, or another situation for which further scrutiny of the footage is appropriate.

In some embodiments, at least a portion of the video footage may be designated for permanent archiving, such as when the video footage documents situations in the facility that are more likely to result in some type of legal proceeding (e.g., situations involving an accident or injury, workplace violence, a fire, or exposure to hazardous materials) than those that can be resolved following an internal investigation (e.g., situations involving simple theft or relatively minor property damage). In some embodiments, upon detection of any condition or event which is likely to lead to a more extensive investigation or legal proceedings, a retention parameter for the corresponding video footage may be modified (either automatically or by a user) so that it is retained at least long enough to be examined by safety, security, maintenance, and/or human resources operations. In different embodiments, an automatic designation of a retention parameter may or may not be overridden by an employee (e.g., an employee in an administrative or executive position), according to applicable policies. In some embodiments, video footage stored in remote storage 1070 (or portions thereof) may be associated with various items that are handled in the materials handling facility in a product database (e.g., as an element of the history of the product). In such embodiments, video footage that records the handling of an item (e.g., during receiving picking, stowing, sorting, or packing) may be useful in determining the source of any damage to the item (e.g., for quality assurance and/or warrantee functions of the facility).

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In particular, network interface 1040 may be configured to allow communication between computer system 1000 and various I/O devices 1050, control system 1060, and/or remote storage 1070. I/O devices 1050 may include a video capture component, one or more still cameras or video cameras of a video-based monitoring and image post-processing system (which may include one or more cameras that implement the functionality of a plenoptic camera) and/or various communication devices, such as those described herein. In some embodiments, each of the still or video cameras may include one or more processors, an image capture component or a video capture component, and memory storing program instructions executable on the one or more processors to implement the methods described herein. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a non-transitory computer-accessible medium configured to store program instructions and data as described above. However, in other embodiments, program instructions and/or data may be received, sent or stored upon different types of computer-accessible media. Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In one embodiment, the relationship between control system 1060 and I/O devices 1050 may be a server/client type of relationship. For example, control system 1060 may be configured as a server computer system 1000 that may convey instructions to and receive acknowledgements from I/O devices 1050 (including, but not limited to, video cameras of a video-based monitoring and image post-processing system and/or communication devices). In such an embodiment, I/O devices 1050 may be relatively simple or "thin" client devices. For example, I/O devices 1050 may be configured as dumb terminals with display, data entry and/or communications capabilities, but otherwise little computational functionality. However, in some embodiments, I/O devices 1050 (including, but not limited to, still or video cameras of a video-based monitoring and image post-processing system and/or communication devices) may be computer systems configured similarly to computer system 1000, including one or more processors 1010 and various other devices (though in some embodiments, a computer system 1000 implementing an I/O device 1050 may have somewhat different devices, or different classes of devices, compared to a computer system 1000 implementing control system 990). It is further contemplated that in some embodiments, the functionality of control system 990 may be distributed across some or all of I/O devices 1050. That is, in some embodiments, there may be no centralized point of control of the activity of materials handling facility agents; rather, I/O devices 1050 may function in a cooperative, distributed fashion to coordinate the activities of the materials handling facility.

In various embodiments, I/O devices 1050 may include, but are not limited to, one or more of: video cameras, handheld devices, devices worn by or attached to the agents, and devices integrated into or mounted on any mobile or fixed equipment of the materials handling facility such as pushcarts, bins, totes, racks, shelves, tables, ceilings, walls, and work benches, according to various embodiments. As noted above, the still or video cameras included in a video-based monitoring and image post-processing system may or may not be configured to apply the post-processing operations described herein. I/O devices 1050 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 1060. In general, an I/O device 1050 may be any device that can communicate with control system 1060 and convey instructions to agents within the facility. In one embodiment, at least some of the I/O devices 1050 may be configured to scan or otherwise read or receive codes or identifiers of various components in the materials handling facility and to communicate the entered codes to control system 1060 for use in directing agents in the various operations of the facility (e.g., bar code scanners, RFID readers, cameras, or any other sensing devices). Such components may include, but are not limited to, one or more of items, orders, modular sorting stations, modular bins, and compartments of modular bins.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plenoptic camera located in a materials handling facility, wherein the plenoptic camera has within its original field of view two or more mirrors, and wherein at least a portion of a respective area of the materials handling facility that is in a field of view of each of the two or more mirrors is not in the original field of view of the plenoptic camera; and
   a server configured to communicate with the plenoptic camera;
   wherein the plenoptic camera is configured to:
      capture raw frames of a first video stream, wherein each raw frame includes image data for a scene including the two or more mirrors in the original field of view of the plenoptic camera; and
      send the raw frames to the server for post-processing;

wherein the server is further configured to:
for each raw frame, post-process the image data in the raw frame to generate respective frames for each of two or more new video streams corresponding to two or more virtual cameras, wherein the two or more new video streams are generated from the first video stream, and wherein each virtual camera depicts an image reflected in a respective one of the two or more mirrors from a perspective of the plenoptic camera;
wherein, to post-process the image data in the raw frame to generate a frame for a video stream of a virtual camera, the server is configured to apply a focusing operation to a portion of the image data in the raw frame that represents image pixels that collectively depict a respective one of the two or more mirrors, wherein the generated frame depicts a portion of the raw frame that comprises the respective one of the two or more mirrors and does not comprise another one of the two or more mirrors, and wherein the focusing operation is dependent on a distance between the respective mirror and the plenoptic camera; and
store the two or more new video streams corresponding to the two or more virtual cameras, wherein the two or more video new streams comprise data representing the generated respective frames each having different portions of the original field of view.

2. The system of claim 1, wherein, to post-process the image data in the raw frame to generate a frame for a video stream of a virtual camera, the server is further configured to extract the portion of the image data that represents image pixels that collectively depict the given mirror prior to applying the focusing operation.

3. The system of claim 1, wherein, to post-process the image data in the raw frame to generate a frame for a video stream of a virtual camera, the server is further configured to:
apply the focusing operation to the image data for the entire raw frame to produce focused image data; and
extract the portion of the focused image data that represents image pixels that collectively depict the given mirror.

4. A method, comprising,
capturing, over a period of time, a first video stream comprising image information for multiple images of an area that is in an original field of view of a plenoptic camera, wherein the area includes two or more mirrors on each of which is reflected an image of a respective portion of another area that is in a field of view of the respective mirror, and wherein at least a portion of the other area is not in the original field of view of the plenoptic camera;
for each one of the multiple images, processing the image information to generate two or more images representing views of respective portions of the other area from perspectives of two or more virtual cameras that each have the same field of view as a respective one of the two or more mirrors, wherein each generated image depicts a portion of the one of the multiple images that comprises a respective one of the two or more mirrors but does not depict all of the area that is in the original field of view of the plenoptic camera; and
storing two or more new video streams for the two or more virtual cameras represented by the two or more mirrors, wherein the two or more new video streams are generated from the first video stream, and wherein the new video streams comprise data representing the respective generated images each having different portions of the original field of view.

5. The method of claim 4, wherein said processing the image information to generate two or more images comprises applying a focusing operation to respective portions of the image information that represent image pixels that collectively depict respective ones of the two or more mirrors, and wherein the focusing operation is dependent on the distances between the mirrors and the plenoptic camera.

6. The method of claim 4, wherein at least one of the mirrors is curved or spherical, and wherein said processing comprises applying a correction operation to the image information to compensate for a distortion of the reflected image caused by the shape of the curved or spherical mirror or to reverse the reflected image.

7. The method of claim 4, wherein said capturing image information for multiple images of the first video stream comprises capturing the first video stream using a video camera.

8. The method of claim 4, wherein said capturing image information for multiple images of the first video stream comprises capturing a sequence of images using a still camera.

9. The method of claim 4, wherein said processing the image information to generate two or more images comprises extracting respective portions of the image information that represent image pixels that collectively depict respective ones of the two or more mirrors.

10. The method of claim 9, wherein said extracting is dependent on a pre-determined mapping between the image pixels that collectively depict the mirrors and identifiers of the mirrors.

11. The method of claim 9, wherein said processing further comprises, prior to said extracting:
analyzing the image information; and
detecting, dependent on said analyzing, respective portions of the image information that represent the image pixels that collectively depict respective ones of the two or more mirrors.

12. A non-transitory, computer-readable storage medium, storing program instructions that when executed on one or more computers cause the one or more computers to perform:
accessing, from a first video stream, image data that includes four-dimensional light-field information about a scene, wherein the four-dimensional light-field information comprises information in two planar dimensions and information in two angular dimensions, wherein the scene includes objects that are at different distances from a camera from which the image data was obtained, wherein the scene includes two or more mirrors in each of which an image of a respective portion of an area is reflected, and wherein at least a portion of the reflected area is not visible in the scene other than in the mirrors;
processing the image data to generate two or more images that represent views of respective portions of the area from perspectives of two or more virtual cameras that each have the same field of view as a respective one of the two or more mirrors, wherein each generated image depicts a portion of the scene but does not depict the entire scene, wherein said processing comprises applying a focusing operation to the image data such that each generated image is in focus, and wherein the focusing operation is dependent on distances between the mirrors and the camera from which the image data was obtained; and storing two or more new video streams for the two or more virtual cameras represented by the two or more mirrors, wherein the two or more new video streams are generated from the first video stream, and wherein the new video streams comprise data representing the respective generated images each having different portions of an original field of view of the camera.

13. The non-transitory, computer-readable storage medium of claim 12, wherein said processing is dependent on a pre-determined mapping between image pixels that collectively depict respective ones of the two or more mirrors and identifiers of the virtual cameras or on a pre-determined mapping between image pixels that collectively depict respective ones of the two or more mirrors and identifiers of the mirrors.

14. The non-transitory, computer-readable storage medium of claim 12, wherein when executed on the one or more computers, the program instructions cause the one or more computers to perform storing data representing the generated images in association with identifiers of the mirrors or in association with identifiers of the virtual cameras.

15. The non-transitory, computer-readable storage medium of claim 12, wherein when executed on the one or more computers, the program instructions cause the one or more computers to perform processing the image data to generate an additional image that represents a view of an object in the scene that is entirely in the original field of view of the camera from which the image data was obtained, wherein said processing comprises applying a focusing operation to the image data such that the additional image is in focus, and wherein the focusing operation is dependent on the distance between the object and the camera from which the image data was obtained.

16. The non-transitory, computer-readable storage medium of claim 12,
    wherein the scene depicts a portion of a materials handling facility;
    wherein the area comprises two or more inventory areas in the materials handling facility; and
    wherein when executed on the one or more computers, the program instructions cause the one or more computers to perform storing data representing the generated images in association with identifiers of the inventory areas or in association with identifiers of items in the inventory areas.

17. The non-transitory, computer-readable storage medium of claim 16, wherein when executed on the one or more computers, the program instructions cause the one or more computers to perform accessing the data representing the generated images in response to a request to view an image depicting a specified inventory area or item.

18. A system, comprising:
    a plenoptic camera;
    one or more processors; and
    program instructions that when executed by the one or more processors cause the one or more processors to perform:
        receiving a first video stream comprising image data from the plenoptic camera, wherein an original field of view of the plenoptic camera includes two or more mirrors, and wherein at least a portion of a field of view of each of the two or more mirrors that is visible to the plenoptic camera by its reflection is not in the original field of view of the plenoptic camera;
        processing the image data to generate two or more images that are each focused on a reflection in a respective one of the two or more mirrors, wherein the generated images depict portions of the original field of view of the plenoptic camera but do not depict the entire original field of view of the plenoptic camera; and
        storing different video streams for each of two or more virtual cameras represented by the two or more mirrors, wherein the different video streams are generated from the first video stream, and wherein the different video streams comprise data representing respective ones of the generated images as frames of respective ones of the different video streams each having different portions of the original field of view.

19. The system of claim 18,
    wherein the plenoptic camera and the two or more mirrors are at known locations with respect to each other; and
    wherein said processing comprises applying a focusing operation to the image data that is dependent on the known locations of the plenoptic camera and the two or more mirrors.

20. The system of claim 18,
    wherein the plenoptic camera is configured to capture a sequence of images;
    wherein said receiving image data comprises receiving image data representing the sequence of images;
    wherein the generated images are focused on reflections that are visible in the two or more mirrors in a given image of the sequence of images; and
    wherein when executed by the one or more processors, the program instruction further cause the one or more processors to perform processing the image data to generate additional images that are focused on reflections that are visible in the two or more mirrors in another image of the sequence of images.

21. The system of claim 18,
    wherein the plenoptic camera is one of a plurality of cameras in a materials handling facility; and
    wherein the fields of view of the plurality of cameras, including the fields of view of the two or more mirrors that are visible to the plenoptic camera by their reflections, collectively encompass all inventory areas of the materials handling facility.

* * * * *